(12) United States Patent
Ohashi et al.

(10) Patent No.: US 10,809,575 B2
(45) Date of Patent: Oct. 20, 2020

(54) DISPLAY DEVICE SUBSTRATE AND DISPLAY DEVICE

(71) Applicant: SHARP KABUSHIKI KAISHA, Sakai, Osaka (JP)

(72) Inventors: Noriyuki Ohashi, Sakai (JP); Shohichi Andoh, Sakai (JP); Yoshihiro Shioaku, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/165,941

(22) Filed: Oct. 19, 2018

(65) Prior Publication Data
US 2019/0121180 A1   Apr. 25, 2019

(30) Foreign Application Priority Data

Oct. 20, 2017   (JP) ................. 2017-203351

(51) Int. Cl.
| | |
|---|---|
| *G02F 1/1337* | (2006.01) |
| *G02F 1/1339* | (2006.01) |
| *G02F 1/1333* | (2006.01) |
| *G06F 3/041* | (2006.01) |
| *G06F 3/044* | (2006.01) |
| *G09G 3/36* | (2006.01) |

(52) U.S. Cl.
CPC .......... *G02F 1/1339* (2013.01); *G02F 1/1337* (2013.01); *G02F 1/133305* (2013.01); *G06F 3/0412* (2013.01); *G06F 3/0443* (2019.05); *G06F 3/0446* (2019.05); *G02F 1/13338* (2013.01); *G06F 3/044* (2013.01); *G09G 3/3677* (2013.01); *G09G 2310/0251* (2013.01)

(58) Field of Classification Search
None
See application file for complete search history.

(56) References Cited

U.S. PATENT DOCUMENTS

| | | | |
|---|---|---|---|
| 2015/0131041 A1 | 5/2015 | Moriwaki | |
| 2018/0217423 A1* | 8/2018 | Suzuki | ............. G02F 1/1337 |
| 2019/0004379 A1* | 1/2019 | Shin | ............. G02F 1/134309 |

FOREIGN PATENT DOCUMENTS

JP   5857125 B2   2/2016

* cited by examiner

*Primary Examiner* — Richard H Kim
(74) *Attorney, Agent, or Firm* — ScienBiziP, P.C.

(57) ABSTRACT

A display device substrate including: a circuit portion; a first organic insulating film disposed on an upper layer side of the circuit portion; a second organic insulating film disposed on an upper layer side of the first organic insulating film; an alignment film disposed on an upper layer side of the second organic insulating film; and a film formation area regulating portion including a recess in a part of the second organic insulating film and disposed to regulate a film formation area of the alignment film and to overlap the circuit portion.

13 Claims, 13 Drawing Sheets

DISPLAY DEVICE SUBSTRATE AND DISPLAY DEVICE

CROSS REFERENCE TO RELATED APPLICATION

This application claims priority from Japanese Patent Application No. 2017-203351 filed on Oct. 20, 2017. The entire contents of the priority application are incorporated herein by reference.

TECHNICAL FIELD

The technology described herein relates to a display device substrate and a display device.

BACKGROUND

A conventional example of a liquid crystal display device is described in Japanese Patent Publication No. 5857125. The liquid crystal display device is provided with: an array substrate; a counter substrate arranged to face the array substrate; a seal material which is provided outside a display region and with which the array substrate and the counter substrate are bonded; a liquid crystal layer provided in a region surrounded by the seal material between the array substrate and the counter substrate; an alignment film provided in a region including the display region on a liquid crystal layer-side surface of each of the array substrate and the counter substrate. The liquid crystal layer-side surface of the array substrate is formed with grooves which extend along the seal material and which are spaced apart from each other in a width direction of the seal material. Part or all of the plurality of grooves that are formed on the display region side of a midway portion in the width direction of the seal material are filled with the alignment film, where the seal material and the alignment film contact each other. On the anti-display region side of the midway portion in the width direction of the seal material, the seal material and the array substrate directly contact each other without the alignment film therebetween.

SUMMARY

In the liquid crystal display device with the configuration described in Japanese Patent Publication No. 5857125, the film formation area of the alignment film is regulated by means of the plurality of grooves formed on the liquid crystal layer-side surface of the array substrate. Specifically, the grooves are formed by providing openings in an insulating film formed on the array substrate. However, the array substrate may be provided, in a non-display region and adjacent to the display region, with a circuit portion for processing signals supplied to the display region, for example. If the grooves are provided to overlap the circuit portion, the circuit portion may be adversely affected by a short-circuit, disconnection or the like. Accordingly, it is necessary to arrange the grooves in the non-display region while avoiding the circuit portion. This, however, may result in an increase in the non-display region, causing a problem to achieving a decrease in frame size.

The technology described herein was made in view of the above circumstances. An object is to achieve a decrease in frame size.

A display device substrate according to the technology described herein includes: a circuit portion; a first organic insulating film disposed on an upper layer side of the circuit portion; a second organic insulating film disposed on an upper layer side of the first organic insulating film; an alignment film disposed on an upper layer side of the second organic insulating film; and a film formation area regulating portion including a recess in a part of the second organic insulating film and disposed to regulate a film formation area of the alignment film and to overlap the circuit portion.

The alignment film is formed by supplying flowable material of the alignment film to the upper layer side of the second organic insulating film, and causing the material to flow to extend on the upper layer side of the second organic insulating film. The material of the alignment film, as it flows on the second organic insulating film, has its film formation area regulated by the film formation area regulating portion including a recess in a part of the second organic insulating film. The film formation area regulating portion is disposed to overlap the circuit portion. Accordingly, compared to if the film formation area regulating portion is arranged so as not to overlap the circuit portion, a decrease in arrangement space can be achieved, and a decrease in frame size of the display device substrate can be achieved in a preferable manner. The circuit portion arranged to overlap the film formation area regulating portion is covered by the first organic insulating film disposed on the lower layer side of the second organic insulating film. Accordingly, the circuit portion is prevented from being subjected to the adverse effect of the film formation area regulating portion including a recess in a part of the second organic insulating film.

According to the technology described herein, a decrease in frame size can be achieved.

DETAILED DESCRIPTION

First Embodiment

A first embodiment of the technology described herein will be described with reference to FIG. 1 to FIG. 4. In the present embodiment, a liquid crystal display device equipped with a position input function (position input function-equipped display device) 10 will be described by way of example. In each of the drawings, an X-axis, a Y-axis, and/or a Z-axis are indicated, the respective axes corresponding to the directions of the drawings. References to upper-lower directions will be made with reference to FIG. 2 and FIG. 3, in which the upper side corresponds to front side and the lower side corresponds to back side.

Figure 1:
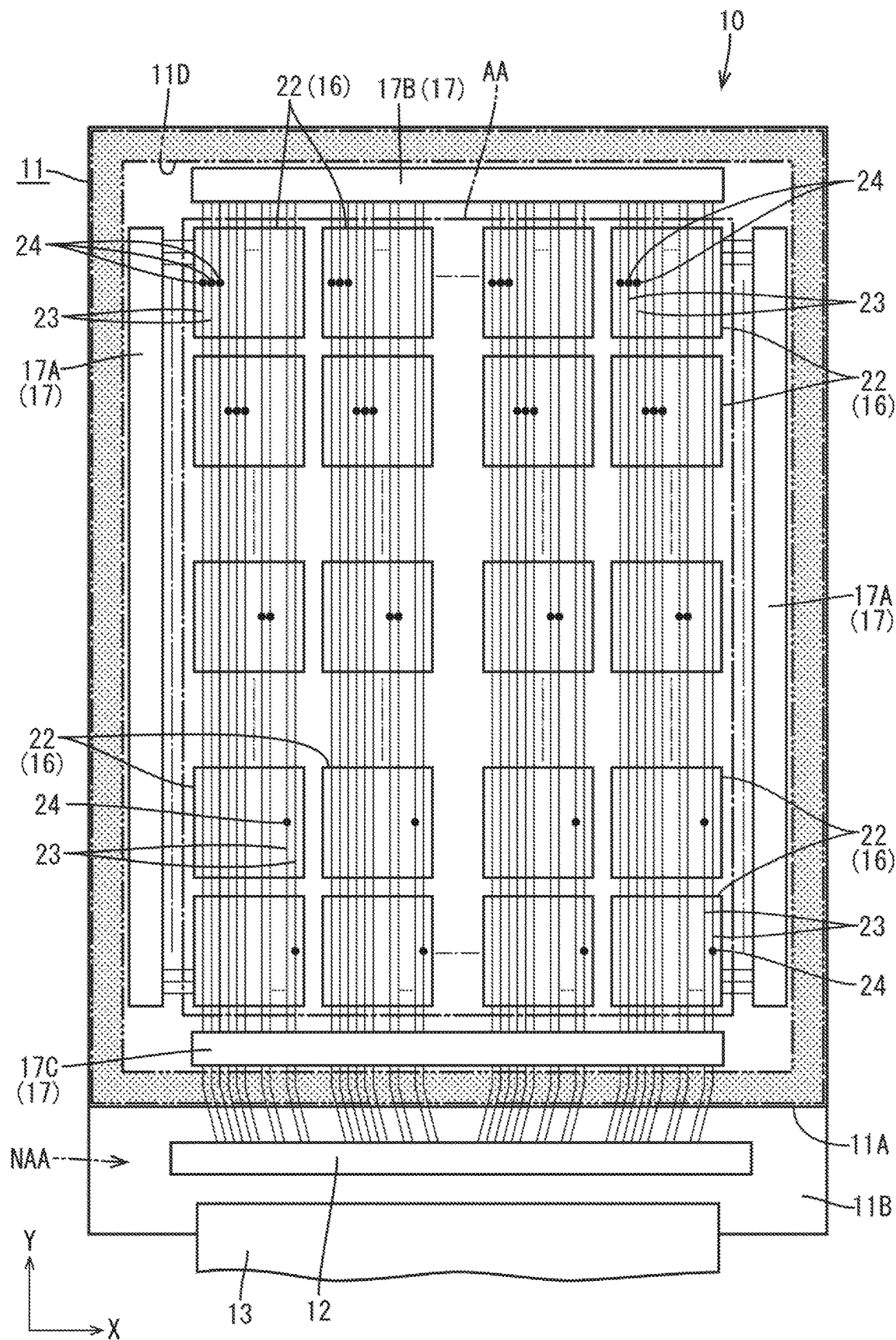
FIG. 1 is a plan view schematically illustrating a planar arrangement of touch electrodes, touch wires and the like in a liquid crystal panel with which a liquid crystal display device according; to the first embodiment of the technology described herein is provided.

As illustrated in FIG. 1, the liquid crystal display device 10 is provided with at least: a liquid crystal panel (display device, display panel) 11 configured to display an image; and a backlight device (illumination device) which is an external light source for irradiating the liquid crystal panel 11 with light utilized for a display. The backlight device is arranged on the back side (rear-surface side) with respect to the liquid crystal panel 11. The backlight device includes, for example, a light source (such as LEDs) that emits white light, and an optical member for providing light from the light source with optical effects for conversion into planar light. Illustration of the backlight device in the drawings is omitted.

As illustrated in FIG. 1, the liquid crystal panel 11 has a generally oblong quadrilateral (rectangular) shape, of which the long-side direction corresponds to the Y-axis direction and the short-side direction corresponds to X-axis direction. The liquid crystal panel 11 is divided into a display region (active region) AA configured to display an image, and a non-display region (non-active region) NAA which has a picture frame-like shape (frame-shape) surrounding the display region AA and which is not configured to display an image. In FIG. 1, the one-dot chain lines forming a frame-shape slightly smaller than a CF substrate 11A represents the outline of the display region AA. The region outside the one-dot chain lines corresponds to the non-display region NAA. The liquid crystal panel 11 includes a pair of substrates 11A, 11B bonded together. The pair of substrates 11A, 11B includes the CF substrate (counter substrate) 11A provided on the front side (front-surface side), and an array substrate (display device substrate; active matrix substrate) 11B provided on the back side (rear-surface side). The array substrate 11B is larger than the CF substrate 11A, and includes a part that protrudes laterally with respect to the CF substrate 11A. In the protruding part (non-display region NAA), a driver (panel drive component) 12 and flexible substrate (signal transmission member) 13 are mounted as components for supplying various signals relating to a display function and a touch panel function. The driver 12 includes an LSI chip having an internal drive circuit, and is mounted on the array substrate 11B using a Chip-On-Glass (COG) technique. The driver 12 processes various signals transmitted by means of the flexible substrate 13. The flexible substrate 13 includes a number of wire patterns formed on an insulating and flexible base material. The flexible substrate 13 is connected to the array substrate 11B of the liquid crystal panel 11 and to a control substrate (signal supply source), not illustrated, and transmits various signals output from the control substrate to the liquid crystal panel 11.

Figure 2:
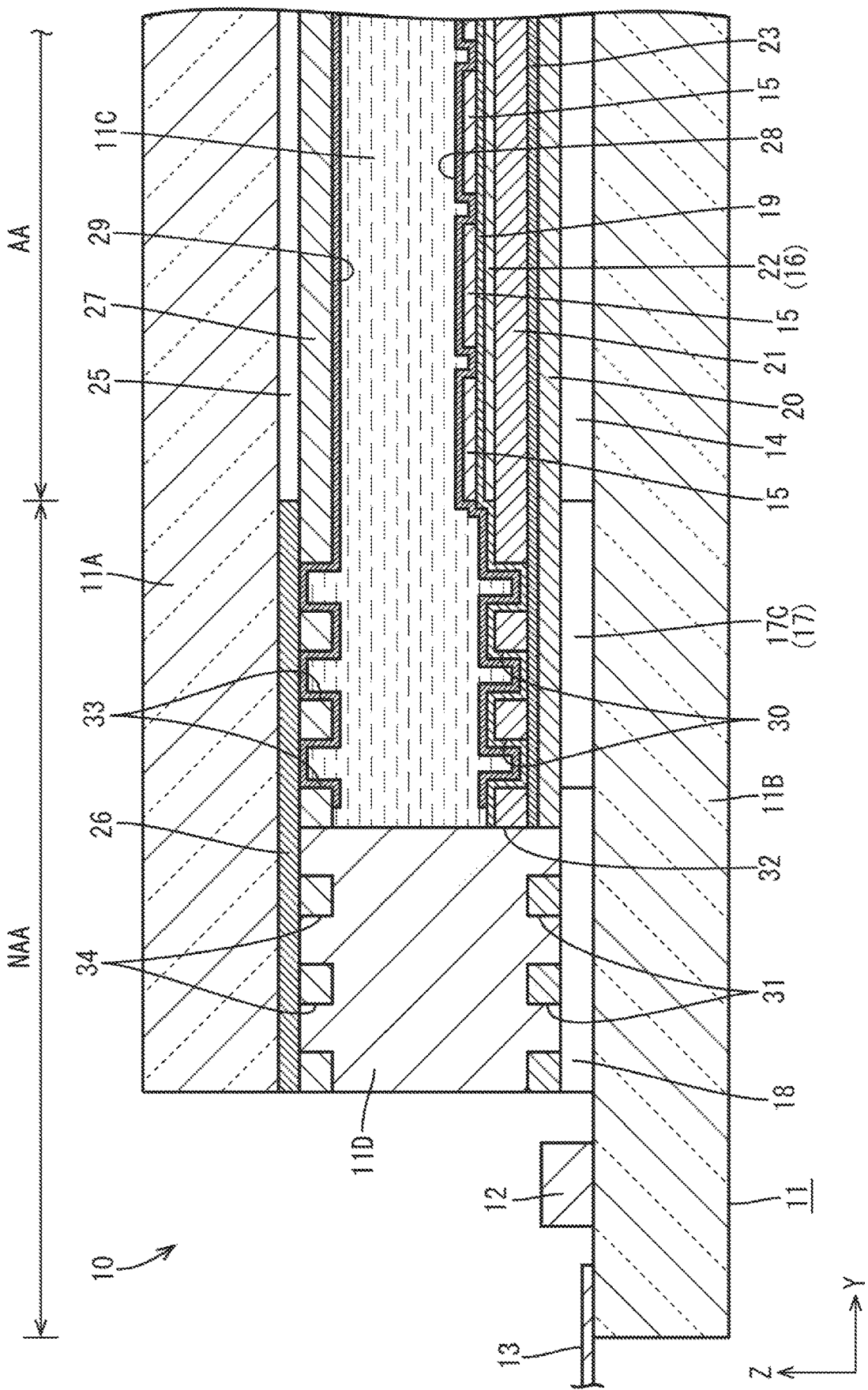
FIG. 2 is a cross sectional view taken along the long-side direction of an end portion of the liquid crystal panel.
Figure 3:
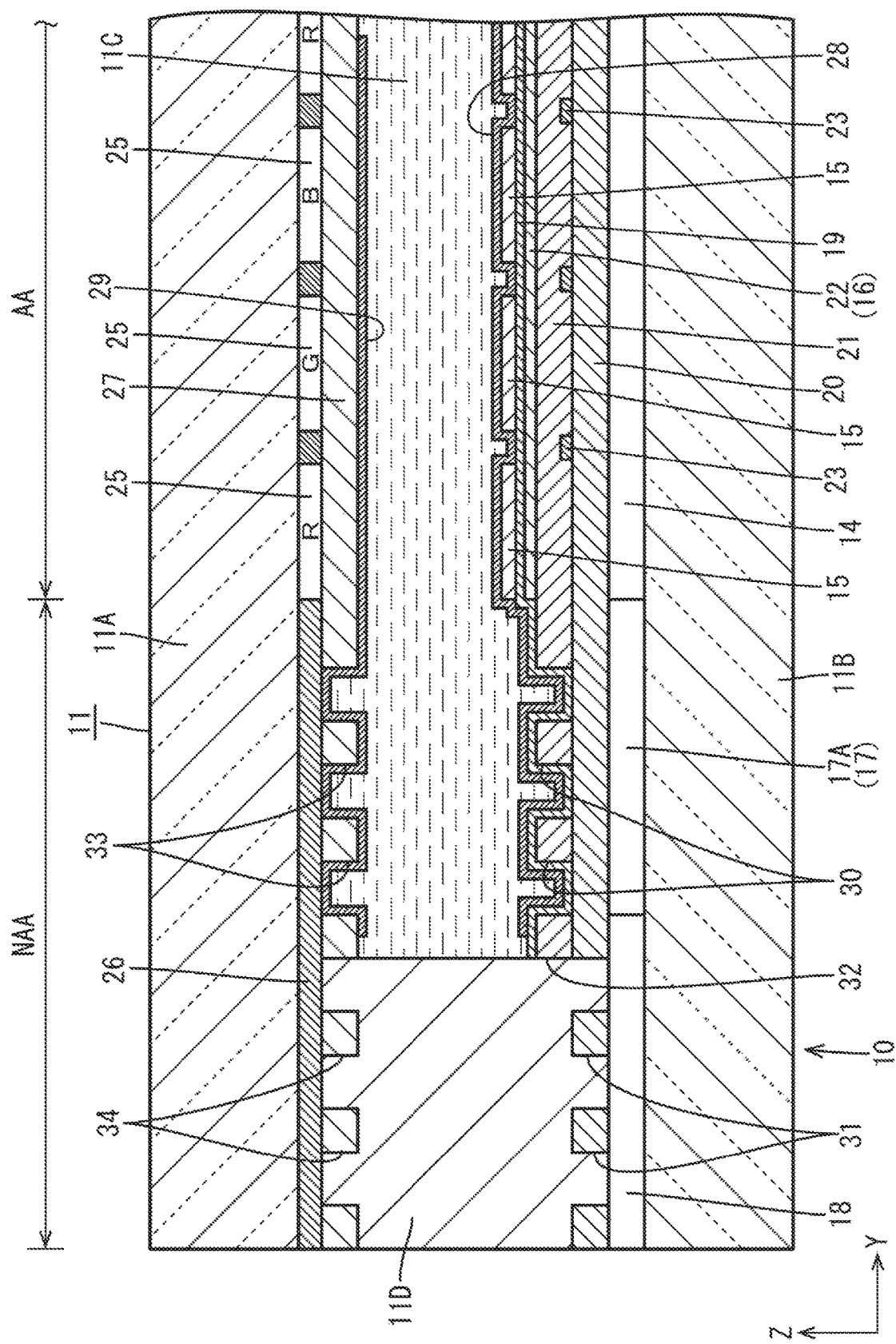
FIG. 3 is a cross sectional view taken along the short-side direction of an end portion of the liquid crystal panel.

As illustrated in FIG. 2 and FIG. 3, between the pair of substrates 11A, 11B opposing each other, there are interposed at least a liquid crystal layer 11C which includes liquid crystal molecules which are matter of which optical characteristics vary in accordance with the application of an electric field, and a seal portion 11D for sealing the liquid crystal layer 11C. The seal portion 11D is disposed in outer peripheral end portions in the non-display region NAA of the substrates 11A, 11B. The seal portion 11D is provided to extend along the entire periphery of the outer peripheral end portions, and has a generally quadrilateral frame-shape (endless annular shape), as viewed in plan (see FIG. 1). In FIG. 1, the area in which the seal portion 11D is formed is indicated by dotted shading. The seal portion 11D serves to maintain a gap (cell gap) corresponding to the thickness of the liquid crystal layer 11C in the outer peripheral end portions of the substrates 11A, 11B. The seal portion 11D is provided when, during the manufacturing process for the liquid crystal panel 11, the CF substrate 11A and the array substrate 11B that have been separately manufactured are bonded to each other. Accordingly, the seal portion 11D is in contact with the inner-most surfaces in the outer peripheral end portions of the substrates 11A, 11B, and is positioned in the upper-most layer of each substrate. While not illustrated in the drawings, in the display region AA, a spacer for maintaining the cell gap is interposed between the substrates 11A, 11B. The outer surface sides of the substrates 11A, 11B respectively have a polarizing plate, not illustrated, affixed thereto.

The internal structure of the liquid crystal panel 11 will be described. Illustration of various structural objects relating to the internal structure is simplified. As illustrated in FIG. 2 and FIG. 3, on the inner surface side of the array substrate 11B, there are provided: a pixel circuit portion 14, pixel electrodes 15, and a common electrode 16 in the display region AA; and a peripheral circuit portion (circuit portion) 17, and a wire connection portion 18 in the non-display region NAA. The pixel circuit portion 14, which is not illustrated in detail in the drawings, includes at least: a gate wire (scan wire) for transmitting a scan signal; a source wire (signal wire) for transmitting an image signal; and a thin film transistor (TFT) which is a switching element connected to the gate wire and the source wire. The gate wire is made of a metal film (first metal film). A number of gate wires extend in the X-axis direction and are disposed side by side at intervals in the Y-axis direction. The source wire is made of a metal film (second metal film) which is disposed on the upper layer side of the gate wire, with a gate insulating film therebetween. A number of source wires extend in the Y-axis direction and are disposed side by side at intervals in the X-axis direction. The TFT has a known configuration including, e.g., a channel portion made of a semiconductor film, and is connected to the pixel electrodes 15. The TFT is driven based on the scan signal transmitted to the gate wire, and supplies the image signal transmitted to the source wire to the pixel electrodes 15 via the channel portion, thereby charging the pixel electrodes 15 to a predetermined potential. The TFT and the pixel electrodes 15 are disposed in a region surrounded by the gate wire and the source wire. Groups of a number of TFTs and pixel electrodes 15 are disposed side by side in a matrix in the X-axis direction and the Y-axis direction. The pixel electrodes 15 are made of a transparent electrode film. The common electrode 16 is made of a transparent electrode film, similarly to the pixel electrodes 15, and is disposed on the lower layer side of the pixel electrodes 15, with an inter-transparent electrode film insulating film (interlayer insulating film) 19 therebetween. The common electrode 16, which will be described later, has a size generally equivalent to the display region AA. The common electrode 16, however, is divided in lattice shape, with the divided segments (touch electrodes 22) overlapping the plurality of pixel electrodes 15 and being connected to the driver 12. At least during a display period, the common electrode 16 is supplied with a substantially constant reference potential, and a potential difference based on the potential with which the pixel electrodes 15 are charged can be caused between the common electrode 16 and the pixel electrodes 15. Electric fields generated based on the potential difference between the common electrode 16 and the pixel electrodes 15 include a fringe electric field (oblique electric field) which includes a component along a plate surface of the array substrate 11B and additionally a component in a direction normal to the plate surface of the array substrate 11B. Accordingly, the liquid crystal panel 11 is in the so-called Fringe Field Switching (FFS) mode, in which the alignment state of the liquid crystal molecules included in the liquid crystal layer 11C is controlled using the fringe electric field. The common electrode 16, as will be described later, serves as an electrode (touch electrodes 22) for detecting a capacitance change associated with a position input during a non-display period. The electrode is connected to the driver 12, which computes the capacitance change to identify the input position in the display region AA, thus providing an in-cell touch panel function.

As illustrated in FIG. 1, the peripheral circuit portion 17 includes a pair of gate driver circuit portions 17A, a pre-charge circuit portion 17B, and a source shared driving (SSD) circuit portion 17C. The circuit portions 17A to 17C include: wires made of the same metal films as those of the gate wire, the source wire and the like; and circuit elements such as TFTs made of the same metal films as those of the gate wire, the source wire and the like, and the same semiconductor film as that of the channel portion. That is, the circuit portions 17A to 17C are monolithically formed on the array substrate 11B based on the metal films, semiconductor films and the like disposed in the non-display region NAA. The pair of gate driver circuit portions 17A is respectively disposed in a pair of long side portions in the non-display region NAA of the array substrate 11B, and is provided to extend substantially the entire length of the display region AA in the Y-axis direction. The gate driver circuit portions 17A are connected to the gate wires led out from the display region AA, and are configured to successively scan the gate wires to drive the TFTs. The pre-charge circuit portion 17B is disposed in the short side portion on the opposite side from the side on which the driver 12 is mounted in the non-display region NAA of the array substrate 11B. The pre-charge circuit portion 17B is provided to extend substantially the entire length of the display region AA in the X-axis direction. The pre-charge circuit portion 17B is connected to the source wires and the like led out from the display region AA on the opposite side from the driver 12 side. For example, the pre-charge circuit portion 17B has a pre-charge function by which, before an image signal is supplied from the driver 12 to the source wires, a pre-charge signal is supplied to the source wires to charge the pixel electrodes 15 to a predetermined potential in advance. The SSD circuit portion 17C is disposed in the short side portion on the side on which the driver 12 is mounted in the non-display region NAA of the array substrate 11B. The SSD circuit portion 17C is provided to extend substantially the entire length of the display region AA in the X-axis direction. The SSD circuit portion 17C is connected to source wires led out from the display region AA on the driver 12 side, and provides a switch function for allocating the image signal supplied from the driver 12 to the source wires. The circuit portions 17A to 17C described above are arranged to surround the display region AA, which is quadrilateral in shape as viewed in plan, from the four sides thereof and around substantially the entire periphery thereof. The circuit portions 17A to 17C are disposed on the inner side of the seal portion 11D (closer to the display region AA) in the non-display region NAA, and are arranged in a non-overlapping manner, as viewed in plan, with respect to the seal portion 11D. The circuit portions 17A to 17C are connected to the driver 12 by means of connection wires, not illustrated, which are provided in the non-display region NAA of the array substrate 11B.

As illustrated in FIG. 2 and FIG. 3, the wire connection portion 18 connects the wire, source wires and the like included in the circuit portions 17A to 17C to the connection wires made of the metal films of another layer. The wire connection portion 18 is formed with a contact hole (not illustrated) for connecting wires through the insulating films interposed between the respective metal films. The wire connection portion 18 is disposed on the outer side of the peripheral circuit portion 17 in the non-display region NAA. The wire connection portion 18 is arranged such that most of the wire connection portion 18 overlaps the seal portion 11D, as viewed in plan. Meanwhile, the peripheral circuit portion 17, as viewed in plan, is interposed between the display region AA and the wire connection portion 18 (seal portion 11D) in planar arrangement, and is arranged adjacent to the display region AA.

As illustrated in FIG. 2 and FIG. 3, on the upper layer side of the pixel circuit portion 14, the peripheral circuit portion 17, and the wire connection portion 18 of the array substrate 11B, a first planarization film (first organic insulating film) 20 and a second planarization film (second organic insulating film) 21 are provided. The first planarization film 20 and the second planarization film 21 are provided as generally solid films in an area extending across the display region AA and the non-display region NAA of the array substrate 11B. The first planarization film 20 and the second planarization film 21 are made of organic material, such as acrylic resin (for example, PMMA), and serve to planarize steps formed on the lower layer side thereof. The first planarization film 20 and the second planarization film 21 have film thicknesses greater than those of other insulating films made of inorganic material. The first planarization film 20 is disposed on the directly upper layer side of the pixel circuit portion 14, the peripheral circuit portion 17, and the wire connection portion 18 to cover the portions from the upper layer side.

The first planarization film 20 is disposed on the lower layer side of the second planarization film 21. The second planarization film 21 is disposed on the upper layer side of the first planarization film 20. Thus, the first planarization film 20 is sandwiched between the second planarization film 21 and the pixel circuit portion 14, the peripheral circuit portion 17, and the wire connection portion 18. The common electrode 16 is disposed on the upper layer side of the second planarization film 21. The first planarization film 20 and the second planarization film 21 are formed with contact holes (not illustrated) for connecting the pixel electrodes 15 and the like to the pixel circuit portion 14 in the display region AA.

In the present embodiment, the liquid crystal panel 11 has both a display function for displaying an image, and a touch panel function (position input function) for detecting the position of input (input position) made by the user based on the displayed image. A touch panel pattern for implementing the touch panel function is integrated ("in-cell"). The touch panel pattern is of the so-called projected capacitance method, and uses a self-capacitive detection method. As illustrated in FIG. 1, the touch panel pattern is provided only on the array substrate 11B. The touch panel pattern includes touch electrodes (position detection electrodes) 22 that are disposed side by side in a matrix in a plate surface of the array substrate 11B. The touch electrodes 22 are disposed in the display region AA of the array substrate 11B. Thus, the display region AA of the liquid crystal panel 11 substantially corresponds to a touch region (position input region) which is configured for input position detection, and the non-display region NAA substantially corresponds to a non-touch region (non-position input region) which is not configured for input position detection. As the user, trying to make a position input based on an image in the display region AA of the liquid crystal panel 11 being viewed, moves his or her finger (position input body), which is an electrical conductor not illustrated, closer to the surface (display surface) of the liquid crystal panel 11, capacitance is formed between the finger and the touch electrodes 22. As the finger approaches, the capacitance detected by the touch electrodes 22 in the vicinity of the finger changes and becomes different from that detected by the touch electrodes 22 farther from the finger. Accordingly, it becomes possible to detect the input position based on the change.

As illustrated in FIG. 1, the touch electrodes 22 are configured from the common electrode 16 provided on the array substrate 11B. The common electrode 16 is partitioned into a substantially lattice shape, forming mutually electrically independent touch electrodes 22 like a grid, as viewed in plan. A plurality of the touch electrodes 22 obtained by partitioning the common electrode 16 are disposed side by side in each of the X-axis direction and the Y-axis direction, forming a matrix in the display region AA. The touch electrodes 22, as viewed in plan, have a quadrilateral shape with each side measuring several millimeters (such as approximately 2 mm to 5 mm), and are far larger than the pixel electrode 15. To the plurality of touch electrodes 22, touch wires (position detect wires) 23 provided on the array substrate 11B are selectively connected. The touch wires 23 extend in the Y-axis direction to overlap and be in parallel with the source wires on the array substrate 11B, and are selectively connected to specific touch electrodes 22 among the plurality of touch electrodes 22 arranged in the Y-axis direction. In addition, the touch wires 23 are connected to the driver 12, which incorporates a detection circuit. The detection circuit may be provided outside the liquid crystal panel 11, with the flexible substrate 13 disposed therebetween. The touch wires 23 supply the touch electrodes 22 with a reference potential signal relating to the display function and with a touch signal (position detection signal) relating to the touch function, at different timings. The reference potential signal is transmitted to all of the touch wires 23 at the same timing, whereby all of the touch electrodes 22 assume a reference potential and function as the electrode 16. It should be noted that FIG. 1 is a schematic illustration of the arrangement of the touch electrodes 22, and that the specific number of the touch electrodes 22 installed or their arrangement may be modified, as appropriate.

The touch wires 23 will be described. As illustrated in FIG. 2 and FIG. 3, the touch wires 23 are disposed on the upper layer side of the first planarization film 20 and on the lower layer side of the second planarization film 21, and are made of a metal film (third metal film) in a layer different from that of the gate wire and the source wire. That is, the touch wires 23 are interposed between the first planarization film 20 and the second planarization film 21. As illustrated in FIG. 1, the second planarization film 21 interposed between the touch wires 23 and the touch electrodes 22 (common electrode 16) is formed with touch wire contact holes (position detection wire contact holes) 24 for connecting the touch wires 23 to the touch electrodes 22. The touch wires 23 generally extend in the Y-axis direction across all of the touch electrodes 22. However, due to the planar arrangement of the touch wire contact holes 24, the touch wires 23 are selectively connected only to specific touch electrodes 22. In FIG. 1, the touch wire contact holes 24 are simply indicated by dots. The touch wires 23 may be connected to the pre-charge circuit portion 17B. The touch wires 23 are connected to connection wires made of a metal film of another layer in the wire connection portion 18 (see FIG. 2).

The internal structure of the CF substrate 11A will be described. As illustrated in FIG. 2 and FIG. 3, in the display region AA on the inner surface side of the CF substrate 11A, a number of color filters 25 are provided at positions overlapping the pixel electrodes 15. The color filters 25 exhibit the three colors of red (R), green (G), and blue (B), and are arranged repeatedly alternately in the X-axis direction while extending in the Y-axis direction, thus forming a generally stripe-shaped arrangement. On the inner surface side of the CF substrate 11A, a light blocking portion (black matrix) 26 for, e.g., preventing color mixing by partitioning adjacent color filters 25 is provided in an area extending across the display region AA and the non-display region NAA. The light blocking portion 26 has a lattice shape overlapping the gate wires and the source wires in the display region AA. In the non-display region NAA, however, the light blocking portion 26 is formed as a solid film. On the upper layer side of the color filters 25 and the light blocking portion 26, an overcoat film (opposing-side insulating film) 27 is formed. The overcoat film 27 is provided as a generally solid film on the CF substrate 11A in an area extending across the display region AA and the non-display region NAA. The overcoat film 27 is made of organic material, such as acrylic resin (for example, PMMA), similarly to the planarization films 20, 21, and serves to planarize steps formed on the lower layer side thereof.

As illustrated in FIG. 2 and FIG. 3, on the inner-most surfaces of the substrates 11A, 11B that are in contact with the liquid crystal layer 11C, an array-side alignment film (alignment film) 28 and a CF-side alignment film (opposing-side alignment film) 29 are respectively provided to orientated the liquid crystal molecules included in the liquid crystal layer 11C. The array-side alignment film 28 and the CF-side alignment film 29 are both made of polyimide, for example. The array-side alignment film 28 and the CF-side alignment film 29 are formed as solid films in substantially the entire area of at least the display region AA on the substrate 11A, 11B, respectively. The array-side alignment film 28 and the CF-side alignment film 29 are optical alignment films which, when irradiated with a specific wavelength region of light (such as ultraviolet radiation), can cause the liquid crystal molecules to be aligned in the direction of optical irradiation. The array-side alignment film 28 is disposed on the upper layer side of the pixel electrodes 15 and the second planarization film 21, and, at least in the display region AA, covers the pixel electrodes 15 and the second planarization film 21 in the entire areas thereof from the upper layer side. The CF-side alignment film 29 is disposed on the upper layer side of the overcoat film 27, and, at least in the display region AA, covers the overcoat film 27 in the entire area thereof from the upper layer side.

As illustrated in FIG. 2 and FIG. 3, in the present embodiment, the array substrate 11B is provided with an array-side film formation area regulating portion (film formation area regulating portion; first film formation area regulating portion) 30 which, due to recesses in a part of the second planarization film 21, regulates the area in which the array-side alignment film 28 is formed. The array-side film formation area regulating portions 30 penetrate through the second planarization film 21 in the film thickness direction (Z-axis direction) in the non-display region NAA, forming openings in the second planarization film 21. The array-side film formation area regulating portions 30 are disposed on the inner side of the seal portion 11D (closer to the display region AA). During the process of manufacturing the array substrate 11B, the array-side alignment film 28 is formed by supplying a flowable material of the array-side alignment film 28 onto the upper layer side of the second planarization film 21 in the display region AA, and causing the material to flow to extend on the upper layer side of the second planarization film 21. The material of the array-side alignment film 28, as it flows over the second planarization film 21 from around the outer peripheral end of the display region AA toward the non-display region NAA, has its film formation area regulated by the array-side film formation area regulating portions 30 formed by the recesses in a part of the second planarization film 21. In this way, the material of the array-side alignment film 28 can be prevented from reaching the formation-planned position of the seal portion 11D. This makes it possible to prevent the problem, when the array substrate 11B is bonded with the CF substrate 11A, of the seal portion 11D being arranged to overlap the array-side alignment film 28 and contacting the array-side alignment film 28. The array-side alignment film 28 does not have high adhesion with respect to the seal portion 11D. Accordingly, by avoiding contact with the seal portion 11D as described above, the adhesive strength of the seal portion 11D is increased, and the seal portion 11D becomes less likely to peel off. While the case has been so far described in which the array-side alignment film 28 and the seal portion 11D do not contact each other, it is not intended to eliminate the possibility of the array-side alignment film 28 and the seal portion 11D contacting each other. For example, when the seal portion 11D is formed, the material of the seal portion 11D may be applied to extend (spill over) onto the side of the array-side film formation area regulating portions 30, and the portion of the seal portion 11D disposed in the array-side film formation area regulating portions 30 may be contacted with the array-side alignment film 28. In this way, although the adhesion between the array-side alignment film 28 and the seal portion 11D may not be high, the adhesive strength can be increased, compared to the non-contact configuration, due to the partial contact of the seal portion 11D with the array-side alignment film 28. In addition, formation area variations that could be introduced during the formation of the seal portion 11D can be absorbed by the array-side film formation area regulating portions 30. The array-side alignment film 28 may be applied using an inkjet device, for example.

As illustrated in FIG. 2 and FIG. 3, the array-side film formation area regulating portions 30 are disposed on the inner side of the wire connection portion 18, and is disposed to overlap the peripheral circuit portion 17, as viewed in plan. If the array-side film formation area regulating portion is to be arranged so as not to overlap the peripheral circuit portion 17 but arranged to overlap the wire connection portion 18, the seal portion 11D would have to be arranged on the outer side of the array-side film formation area regulating portion so as not to overlap the array-side film formation area regulating portion. In comparison, when the array-side film formation area regulating portions 30 overlap the peripheral circuit portion 17 as described above, a decrease in arrangement space can be achieved. In this way, a decrease in frame size of the array substrate 11B and the liquid crystal panel 11 can be achieved in a preferable manner. Meanwhile, the peripheral circuit portion 17 overlapping the array-side film formation area regulating portions 30 are covered by the first planarization film 20 disposed on the lower layer side of the second planarization film 21. Accordingly, the peripheral circuit portion 17 is prevented from being subjected to the adverse effect of the array-side film formation area regulating portions 30 provided by opening the second planarization film 21. Conventionally, a planarization film has a single layer. Accordingly, if the arrangement is adopted in which the array-side film formation area regulating portion overlaps the peripheral circuit portion 17, the peripheral circuit portion 17 may be short-circuited with the common electrode 16, the touch wires 23 and the like due to an array-side film formation area regulating portion penetrating through the single-layer planarization film, or other problems, such as disconnection of the wires, may be caused. In contrast, in the present embodiment, the planarization films 20, 21 are dual-layered, where the second planarization film 21 on the upper layer side is provided with the array-side film formation area regulating portions 30. Accordingly, even when the array-side film formation area regulating portions 30 are arranged to overlap the peripheral circuit portion 17, the problems of the conventional arrangement are avoided.

Figure 4:
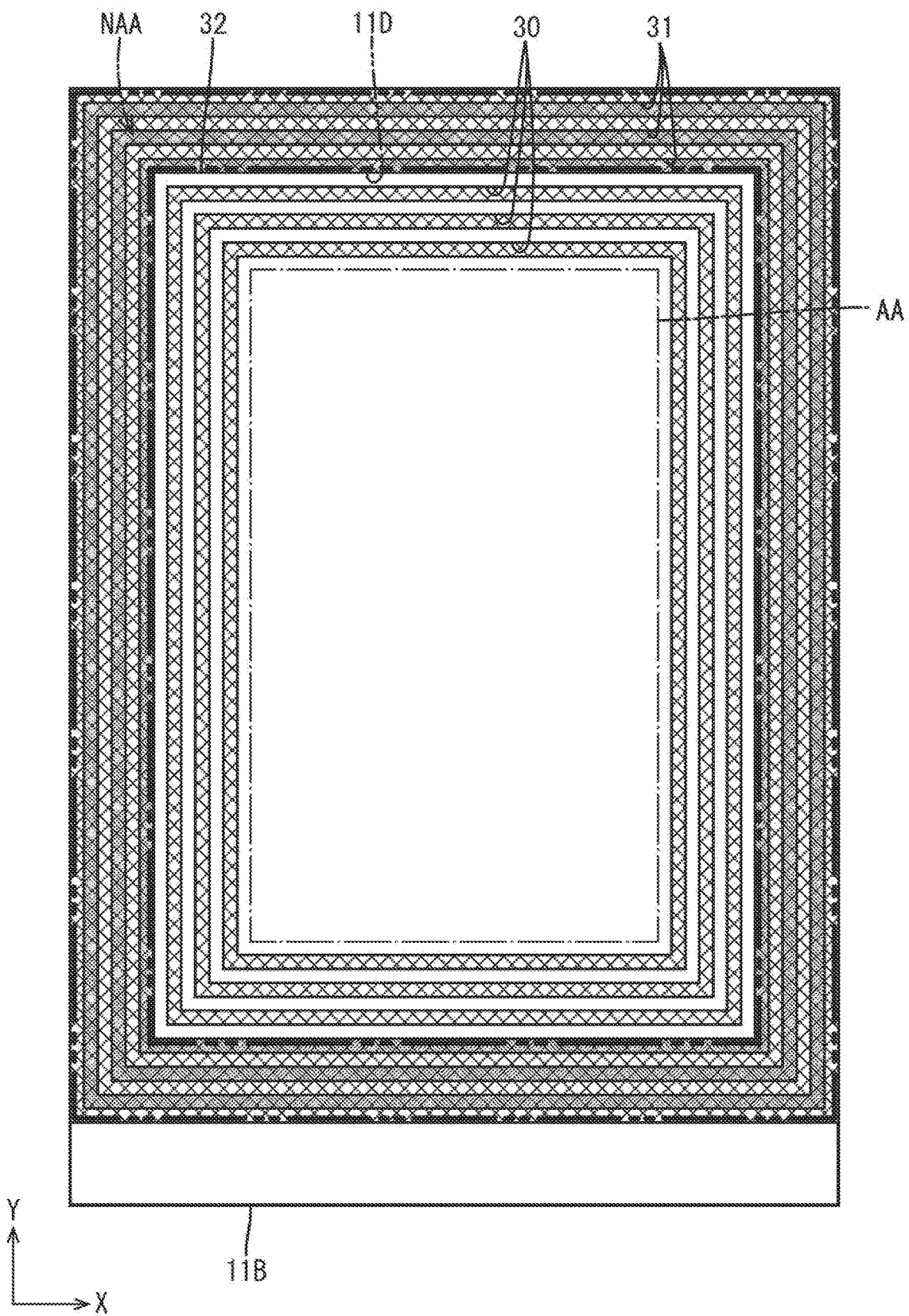
FIG. 4 is a plan view schematically illustrating a planar arrangement of an array-side film formation area regulating portion, seal-overlapping opening; portions and the like of an array substrate of the liquid crystal panel.

As illustrated in FIG. 4, the array-side film formation area regulating portions 30 are in the form of grooves extending along the outer periphery (the circumferential direction tracing the outer peripheral end surface) of the array substrate 11B. The array-side film formation area regulating portions 30 extend along the entire periphery of the array substrate 11B, and, as viewed in plan, have a quadrilateral endless annular shape (frame-shape). That is, the array-side film formation area regulating portions 30 are parallel with the seal portion 11D along the entire periphery thereof. In FIG. 4, the areas in which the second planarization film 21 is not formed (areas in which array-side film formation area regulating portions 30 and the like are formed) are indicated by oblique-lattice shading. In this way, compared to if array-side film formation area regulating portions are to be disposed side by side at intervals along the outer periphery of the array substrate 11B, or if the array-side film formation area regulating portions have an annular shape with ends, the film formation area regulating function of the array-side film formation area regulating portions 30 with respect to the array-side alignment film 28 is further enhanced. A plurality of (three) array-side film formation area regulating portions 30 are disposed side by side at intervals and parallel with each other in the inner-outer direction. The plurality of array-side film formation area regulating portions 30 increase the certainty with which the film formation area of the array-side alignment film 28 is regulated. Accordingly, it becomes possible to more reliably prevent the material of the array-side alignment film 28 from reaching the formation-planned position of the seal portion 11D.

Further, as illustrated in FIG. 2 and FIG. 3, the array substrate 11B is provided with first seal-overlapping opening portions 31 including openings in a part of the first planarization film 20. The first seal-overlapping opening portions 31 are disposed to overlap a part of the seal portion 11D. In addition, the array substrate 11B is provided with a second seal-overlapping opening portion 32 including an opening in a part of the second planarization film 21, the second seal-overlapping opening portion 32 being disposed to overlap at least the first seal-overlapping opening portions 31. Accordingly, the first seal-overlapping opening portions 31 provided in the first planarization film 20 communicate with the second seal-overlapping opening portion 32 provided in the second planarization film 21 on the upper layer side. In this case, when the seal portion 11D is provided, the seal portion 11D enters the first seal-overlapping opening portions 31 via the second seal-overlapping opening portion 32 and is in contact with an underlayer (such as an insulating film which is disposed on the wire connection portion 18 and made of inorganic material). Accordingly, compared to if the seal portion does not contact the underlayer and only contacted the first planarization film 20 or the second planarization film 21, the adhesion of the seal portion 11D is increased. In addition, the second seal-overlapping opening portion 32 has a formation area overlapping the entire area of the seal portion 11D. Accordingly, the second planarization film 21 is not formed in an area overlapping the seal portion 11D. In this way, even when the adhesion of the second planarization film 21 with respect to the first planarization film 20 is not high, the seal portion 11D becomes less likely to peel off.

As illustrated in FIG. 4, the first seal-overlapping opening portions 31 are in the form of grooves extending along the outer periphery of the array substrate 11B. The first seal-overlapping opening portions 31 extend along the entire periphery of the array substrate 11B and, as viewed in plan, have a quadrilateral endless annular shape (frame-shape). That is, the first seal-overlapping opening portions 31 are parallel with the seal portion 11D and the array-side film formation area regulating portions 30 along the entire periphery thereof. In FIG. 4, the areas in which the first planarization film 20 is not formed (areas in which the first seal-overlapping opening portions 31 are formed) are indicated by dotted shading different from the shading (oblique-lattice shading) indicating the areas in which the second planarization film 21 is not formed. In this way, compared to if first seal-overlapping opening portions are disposed side by side at intervals along the outer periphery of the array substrate 11B, or if the first seal-overlapping opening portions have an annular shape with ends, the formation area with respect to the first seal-overlapping opening portions 31 is increased. Thus, the adhesion of the seal portion 11D can be further increased. A plurality of (three) first seal-overlapping opening portions 31 are disposed side by side at intervals and parallel with each other in the inner-outer direction. Due to the plurality of first seal-overlapping opening portions 31, the adhesion of the seal portion 11D can be further increased. The second seal-overlapping opening portion 32 has a width dimension entirely covering the plurality of first seal-overlapping opening portions 31, and extends in parallel with the first seal-overlapping opening portions 31 and along the entire periphery of the array substrate 11B. In this way, the second seal-overlapping opening portion 32 is arranged to overlap the seal portion 11D and the plurality of first seal-overlapping opening portions 31 along the entire peripheries thereof and throughout the entire areas thereof.

As illustrated in FIG. 2 and FIG. 3, the CF substrate 11A are provided with CF-side film formation area regulating portions (opposing-side film formation area regulating portion; second film formation area regulating portion) 33 including recesses in a part of the overcoat film 27. The CF-side film formation area regulating portions 33 regulate the film formation area with respect to the CF-side alignment film 29. The CF-side film formation area regulating portions 33 penetrate through the overcoat film 27 in the film thickness direction (Z-axis direction) in the non-display region NAA, forming openings in the overcoat film 27. The CF-side film formation area regulating portions 33 are disposed on the inner side of the seal portion 11D (closer to the display region AA). During the manufacturing process for the CF substrate 11A, the CF-side alignment film 29 is formed by supplying flowable material of the CF-side alignment film 29 onto the upper layer side of the overcoat film 27 in the display region AA, and then causing the material to flow to extend on the upper layer side of the overcoat film 27. The material of the flow CF-side alignment film 29, as it flows on the overcoat film 27 from around the outer peripheral end of the display region AA toward the non-display region NAA, has its film formation area regulated by the CF-side film formation area regulating portions 33 provided including recesses in a part of the overcoat film 27. In this way, the material of the CF-side alignment film 29 can be prevented from reaching the formation-planned position of the seal portion 11D. This makes it possible to prevent the problem of the seal portion 11D, when the CF substrate is bonded to the array substrate 11B, being arranged to overlap the CF-side alignment film 29 and contacting the CF-side alignment film 29. The CF-side alignment film 29 does not have high adhesion with respect to the seal portion 11D. Accordingly, by avoiding contact with the seal portion 11D as described above, the adhesive strength of the seal portion 11D is increased, and the seal portion 11D becomes less likely to peel off. The CF-side alignment film 29 may be applied using an inkjet device, for example.

As illustrated in FIG. 2 and FIG. 3, the CF-side film formation area regulating portions 33 are disposed on the inner side of the wire connection portion 18 on the array substrate 11B side, and are disposed to overlap the array-side film formation area regulating portions 30 and the peripheral circuit portion 17, as viewed in plan. Compared to if the CF-side film formation area regulating portions are to be arranged so as not to overlap the peripheral circuit portion 17 but arranged to overlap the wire connection portion 18, the seal portion 11D would have to be arranged on the outer side of the CF-side film formation area regulating portions so as not to overlap the CF-sine film formation area regulating portions. In comparison, the CF-side formation area regulating portions 33 overlap the peripheral circuit portion 17, as described above, a decrease in arrangement space can be achieved. In this way, a decrease frame sze of the CF substrate 11A and the liquid crystal panel 11 can be achieved in a preferable manner. The CF substrate 11A is not provided with the peripheral circuit portion 17 as on the array substrate 11B side. Accordingly, even when the overcoat film 27 is formed with the openings for the CF-side film formation area regulating portions 33, no adverse effect in particular is caused.

As illustrated in FIG. 2 and FIG. 3, the CF substrate 11A is further provided with CF-side seal-overlapping opening portions (opposing-side seal-overlapping opening portion) 34 including openings in a part of the overcoat film 27. The CF-side seal-overlapping opening portions 34 are disposed to overlap a part of the seal portion 11D. In this case, when the seal portion 11D is provided, the seal portion 11D enters the CF-side seal-overlapping opening portions 34 and is in contact with an underlayer (such as the light blocking portion 26). Accordingly, compared to if the seal portion does not contact the underlayer and only contacted the overcoat film 27, the adhesion of the seal portion 11D is increased. While detailed illustration in the drawings is omitted, the CF-side seal-overlapping opening portions 34, similarly to the first seal-overlapping opening portions 31 on the array substrate 11B side, extend along the entire periphery of the CF substrate 11A and form a quadrilateral endless annular shape (frame-shape) as viewed in plan. A plurality of (three) CF-side seal-overlapping opening portions 34 are disposed at intervals in the inner-outer direction, for example.

As described above, in the present embodiment, the array substrate (display device substrate) 11B is provided with: the peripheral circuit portion (circuit portion) 17; the first planarization film (first organic insulating film) 20 disposed on the upper layer side of the peripheral circuit portion 17; the second planarization film (second organic insulating film) 21 disposed on the upper layer side of the first planarization film 20; the array-side alignment film (alignment film) 28 disposed on the upper layer side array-side of the second planarization film 21; and the array-side film formation area regulating portions (film formation area regulating portion) 30 including recesses in a part of the second planarization film 21 which regulate the film formation area of the array-side alignment film 28 and are disposed to overlap the peripheral circuit portion 17.

In this case, the array-side alignment film 28 is formed by supplying flowable material of the array-side alignment film 28 to the upper layer side of the second planarization film 21 and causing the material to flow to extend on the upper layer side of the second planarization film 21. The material of the array-side alignment film 28, as it flows on the second planarization film 21, has its film formation area regulated by the array-side film formation area regulating portions 30 including recesses in a part of the second planarization film 21. The array-side film formation area regulating portions 30 are disposed to overlap the peripheral circuit portion 17. Accordingly, compared to if the array-side film formation area regulating portions 30 are arranged not to overlap the peripheral circuit portion 17, a decrease in arrangement space can be achieved, and a decrease in frame size of the array substrate 11B can be achieved in a preferable manner. The peripheral circuit portion 17 arranged to overlap the array-side film formation area regulating portions 30 is covered by the first planarization film 20 disposed on the lower layer side of the second planarization film 21. Accordingly, the peripheral circuit portion 17 is prevented from being subjected to the adverse effect due to the array-side film formation area regulating portions 30 including recesses in a part of the second planarization film 21.

The array substrate (display device substrate) 11B is also provided with: the seal portion 11D disposed on the upper layer side of the second planarization film 21 and on the outer side of the array-side film formation area regulating portions 30; the first seal-overlapping opening portions 31 including openings in a part of the first planarization film 20 and disposed to overlap at least a part of the seal portion 11D; and the second seal-overlapping opening portion 32 including an opening in a part of the second planarization film 21, and disposed to overlap at least the first seal-overlapping opening portions 31. In this way, the film formation area of the array-side alignment film 28 is regulated by the array-side film formation area regulating portions 30. Accordingly, the seal portion 11D, which is disposed on the upper layer side of the second planarization film 21 and on the outer side of the array-side film formation area regulating portions 30, becomes less likely to contact the array-side alignment film 28. Thus, the seal portion 11D becomes less likely to peel off. In addition, the seal portion 11D enters the first seal-overlapping opening portions 31, which include openings in a part of the first planarization film 20 and overlap at least a part of the seal portion 11D, via the second seal-overlapping opening portion 32 including an opening in a part of the second planarization film 21 and overlapping the first seal-overlapping opening portions 31. Thus, the seal portion 11D disposed in the first seal-overlapping opening portions 31 is in contact with the underlayer. In this case, compared to if the seal portion does not contact the underlayer and only contacted the first planarization film 20 or the second planarization film 21, the adhesion of the seal portion 11D is increased.

The second seal-overlapping opening portion 32 has a formation area overlapping at least the entire area of the seal portion 11D. In this way, presence of the second planarization film 21 in the area overlapping the seal portion 11D is avoided. Thus, even when the adhesion of the second planarization film 21 with respect to the first planarization film 20 is not high, the seal portion 11D becomes less likely to peel off.

The first seal-overlapping opening portions 31 extend along the outer periphery of the array substrate 11B. In this way, compared to if first seal-overlapping opening portions are disposed side by side at intervals along the outer periphery of the array substrate 11B, the adhesion of the seal portion 11D can be increased even further.

The first seal-overlapping opening portions 31 extend along the entire periphery of the array substrate 11B and forms an endless annular shape. In this way, compared to if the first seal-over lapping opening portion forms an annular shape with ends, the adhesion of the seal portion 11D can be further increased.

The array-side film formation area regulating portions 30 extend along the outer periphery of the array substrate 11B. In this way, compared to if array-side film formation area regulating portions are disposed side by side at intervals along the outer periphery of the array substrate 11B, the film formation area regulating function of the array-side film formation area regulating portions 30 with respect to the array-side alignment film 28 is enhanced.

The array-side film formation area regulating portions 30 extend along the entire periphery of the array substrate 11B and form an endless annular shape. In this way, compared to if the array-side film formation area regulating portion forms an annular shape with ends, the film formation area regulating function of the array-side film formation area regulating portions 30 with respect to the array-side alignment film 28 is enhanced.

In the present embodiment, the liquid crystal panel (display device) 11 is provided with the array substrate 11B and the CF substrate (counter substrate) 11A disposed to face the array substrate 11B. In the liquid crystal panel 11 with such configuration, a decrease in frame size of the array substrate 11B is achieved. Accordingly, improvements in exterior design and the like can be achieved in a preferable manner.

The liquid crystal panel (display device) 11 is also provided with: the overcoat film (opposing-side insulating film) 27 disposed on the CF substrate 11A; the CF-side alignment film (opposing-side alignment film) 29 disposed on the upper layer side of the overcoat film 27; and the CF-side film formation area regulating portions (opposing-side film formation area regulating portion) 33 including recesses in a part of the overcoat film 27 and regulating the film formation area of the CF-side alignment film 29, the CF-side film formation area regulating portions 33 being disposed to overlap the peripheral circuit portion 17. The CF-side alignment film 29 is formed by supplying flowable material of the CF-side alignment film 29 to the CF substrate 11A and causing the material to flow to extend on the upper layer side of the overcoat film 27 on the CF substrate 11A. In this case, the material of the CF-side alignment film 29, as it flows on the overcoat film 27, has its film formation area regulated by the CF-side film formation area regulating portions 33 including recesses in a part of the overcoat film 27. In addition, the CF-side film formation area regulating portions 33 are disposed to overlap the peripheral circuit portion 17. Accordingly, compared to if the CF-side film formation area regulating portions 33 are arranged not to overlap the peripheral circuit portion 17, a decrease in arrangement space can be achieved. Consequently, a decrease in frame size of the liquid crystal panel 11 can be achieved in a preferable manner.

The liquid crystal panel (display device) 11 is also provided with: the seal portion 11D which is disposed on the outer side of the array-side film formation area regulating portions 30 and the CF-side film formation area regulating portions 33, and which seals between the array substrate 11B and the CF substrate 11A; and the CF-side seal-overlapping opening portions (opposing-side seal-overlapping opening portion) 34 including openings in a part of the overcoat film 27 and disposed to overlap at least a part of the seal portion 11D. In this way, the film formation area of the CF-side alignment film 29 is regulated by the CF-side film formation area regulating portions 33, and the seal portion 11D, disposed on the outer side of the CF-side film formation area regulating portions 33, becomes less likely to contact the CF-side alignment film 29. As a result, the seal portion 11D becomes less likely to peel off. In addition, the seal portion 11D enters the CF-side seal-overlapping opening portions 34 including openings in a part of the overcoat film 27 and overlapping at least a part of the seal portion 11D. Thus, the seal portion 11D disposed in the CF-side seal-overlapping opening portions 34 is in contact with the underlayer. Accordingly, compared to if the seal portion does not contact the underlayer and only contacted the overcoat film 27, the adhesion of the seal portion 11D is increased.

Second Embodiment

The second embodiment of the technology described herein will be described with reference to FIG. 5 or FIG. 6. In the second embodiment, the configuration of first seal-overlapping opening portions 131 is modified. Redundant descriptions of structures, operations, and effects similar to those of the first embodiment will be omitted.

Figure 5:
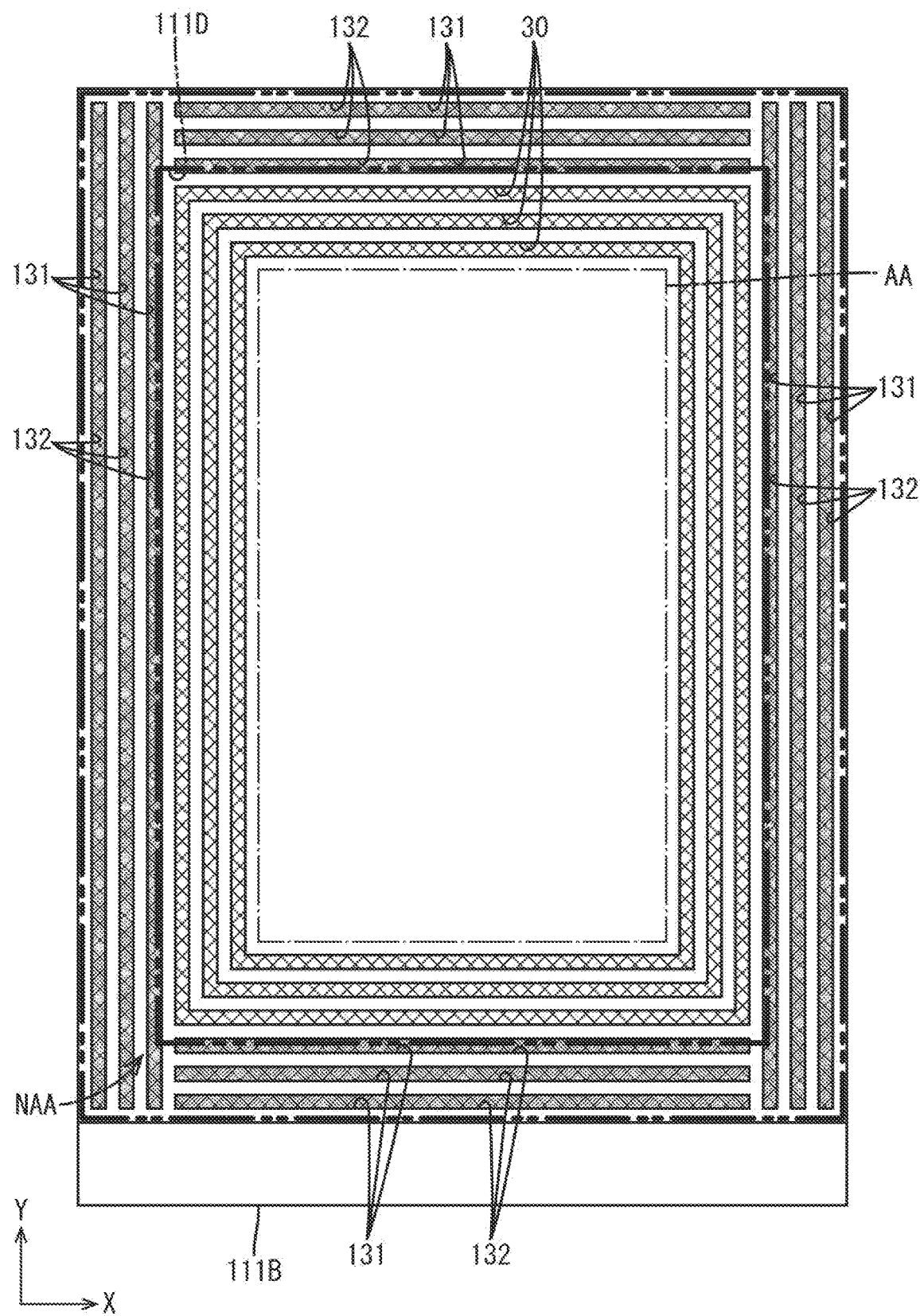
FIG. 5 is a plan view schematically illustrating a planar arrangement of an array-side film formation area regulating portion, seal-overlapping opening portions and the like of an array substrate of a liquid crystal panel according to the second embodiment of the technology described herein.
Figure 6:
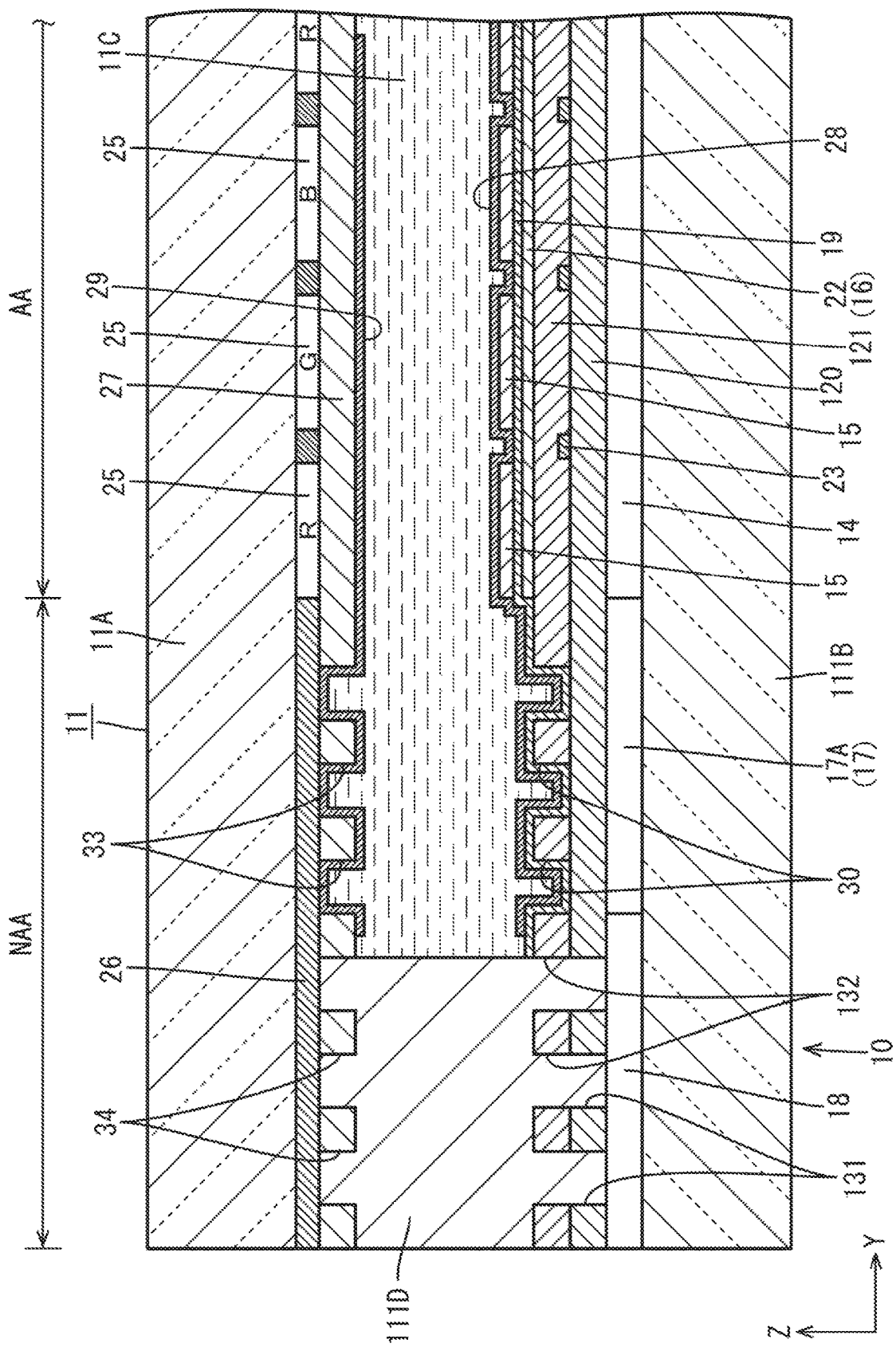
FIG. 6 is a cross sectional view taken along the short-side direction of an end portion of the liquid crystal panel.

As illustrated in FIG. 5, in the present embodiment, four first seal-overlapping opening portions 131 are provided to extend linearly along a pair of short sides and a pair of long sides of an array substrate 111B, and generally have an annular shape with ends surrounding the display region AA. That is, the first seal-overlapping opening portions 131 are terminated at each of the four corners of the array substrate 111B. Further, as illustrated in FIG. 6, (three) second seal-overlapping opening portions 132 are disposed side by side at intervals in the inner-outer direction, similarly to the first seal-overlapping opening portions 131. The plurality of (three) second seal-overlapping opening portions 132 have a width dimension and a planar arrangement corresponding to those of the first seal-overlapping opening portions 131. That is, the second seal-overlapping opening portions 132 individually overlap the plurality of first seal-overlapping opening portions 131 along the entire periphery and in the entire area. A second planarization film 121 provided with the second seal-overlapping opening portions 132 also remains in the formation area of a seal portion HID, similarly to a first planarization film 120 provided with the first seal-overlapping opening portions 131. The remaining portions of the second planarization film 121 overlap the remaining portions of the first planarization film 120.

Third Embodiment

The third embodiment of the technology described herein will be described with reference to FIG. 7. In the third embodiment, the configuration of first seal-overlapping opening portions 231 is modified from that of the first embodiment. Redundant descriptions of structures, operations, and effects similar to those of the first embodiment will be omitted.

Figure 7:
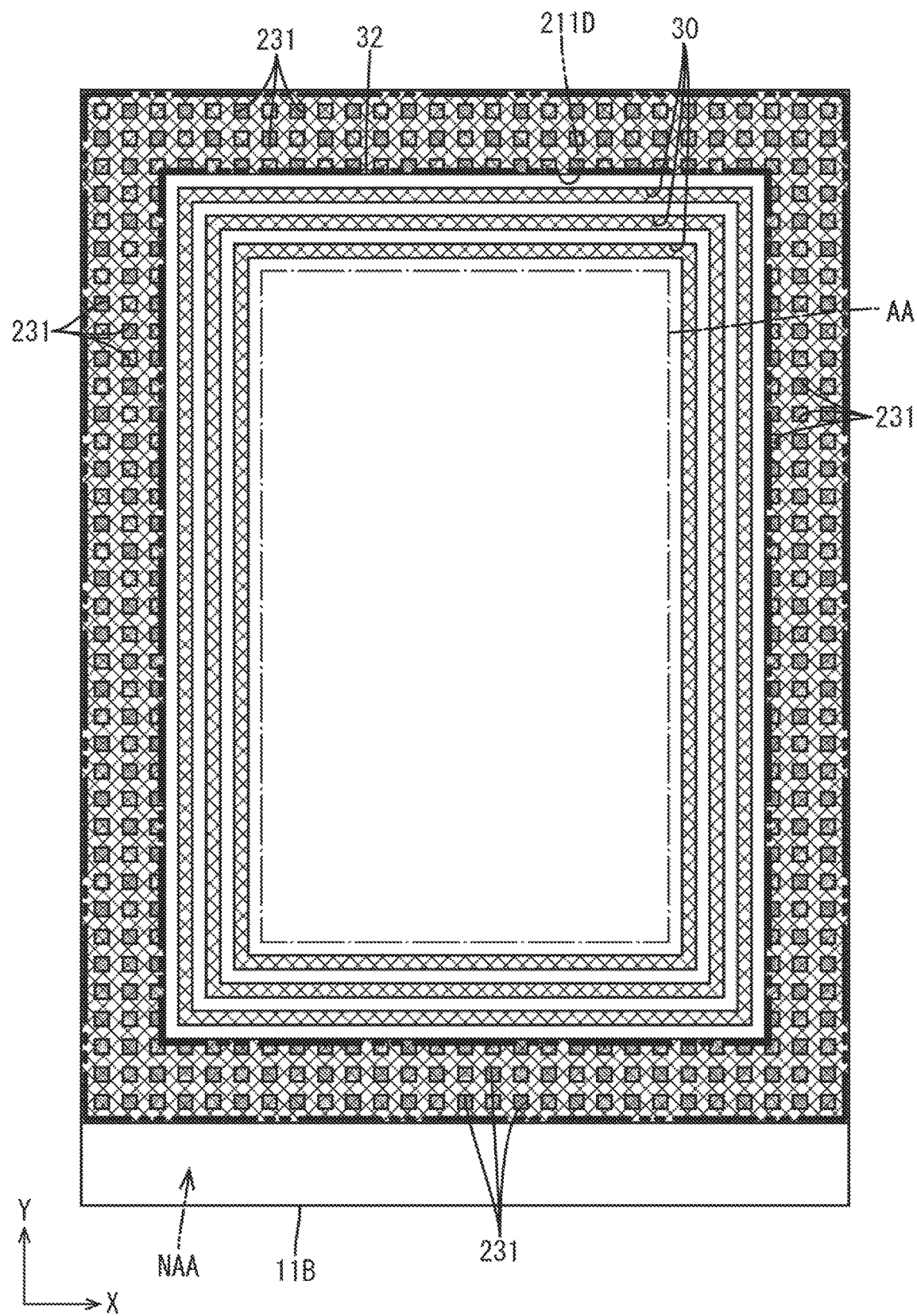
FIG. 7 is a plan view schematically illustrating a planar arrangement of an array-side film formation area regulating portion, seal-overlapping opening portions and the like of an array substrate of a liquid crystal panel according to the third embodiment of the technology described herein.

In the present embodiment, as illustrated in FIG. 7, first seal-overlapping opening portions 231 are disposed side by side at intervals along the outer periphery of an array substrate 211B. The first seal-overlapping opening portions 231 have a substantially square dot-like planar shape, and are formed in the first planarization film (not illustrated in the present embodiment). A number of the first seal-overlapping opening portions 231 are disposed side by side at substantially equal intervals along the entire periphery of the overlapping seal portion 211D. A plurality of (three) first seal-overlapping opening portions 231 are disposed side by side at substantially equal intervals in the width direction of the overlapping seal portion 211D. That is, the first seal-overlapping opening portions 231 have a matrix-like planar arrangement in a frame-shape region overlapping the seal portion 211D. In this way, compared to the first embodiment in which the first seal-overlapping opening portions 31 extend along the outer periphery of the array substrate 11B (see FIG. 4), the non-opening area of the first planarization film is increased. As a result, the insulating performance and the like of the first planarization film are enhanced.

As described above, according to the present embodiment, the first seal-overlapping opening portions 231 are disposed side by side at intervals along the outer periphery of the array substrate 211B. In this way, compared to if the first seal-overlapping opening portions are to extend along the outer periphery of the array substrate 211B, the non-opening area of the first planarization film is increased. As a result, the insulating performance and the like of the first planarization film are enhanced.

Fourth Embodiment

The fourth embodiment of the technology described herein will be described with reference to FIG. 8 or FIG. 9. In the fourth embodiment, the configuration of first seal-overlapping opening portion 331 is modified from that of the first embodiment, and array-side tubular portions 35 are added, for example. Redundant descriptions of structures, operations, and effects similar to those of the first embodiment will be omitted.

Figure 8:
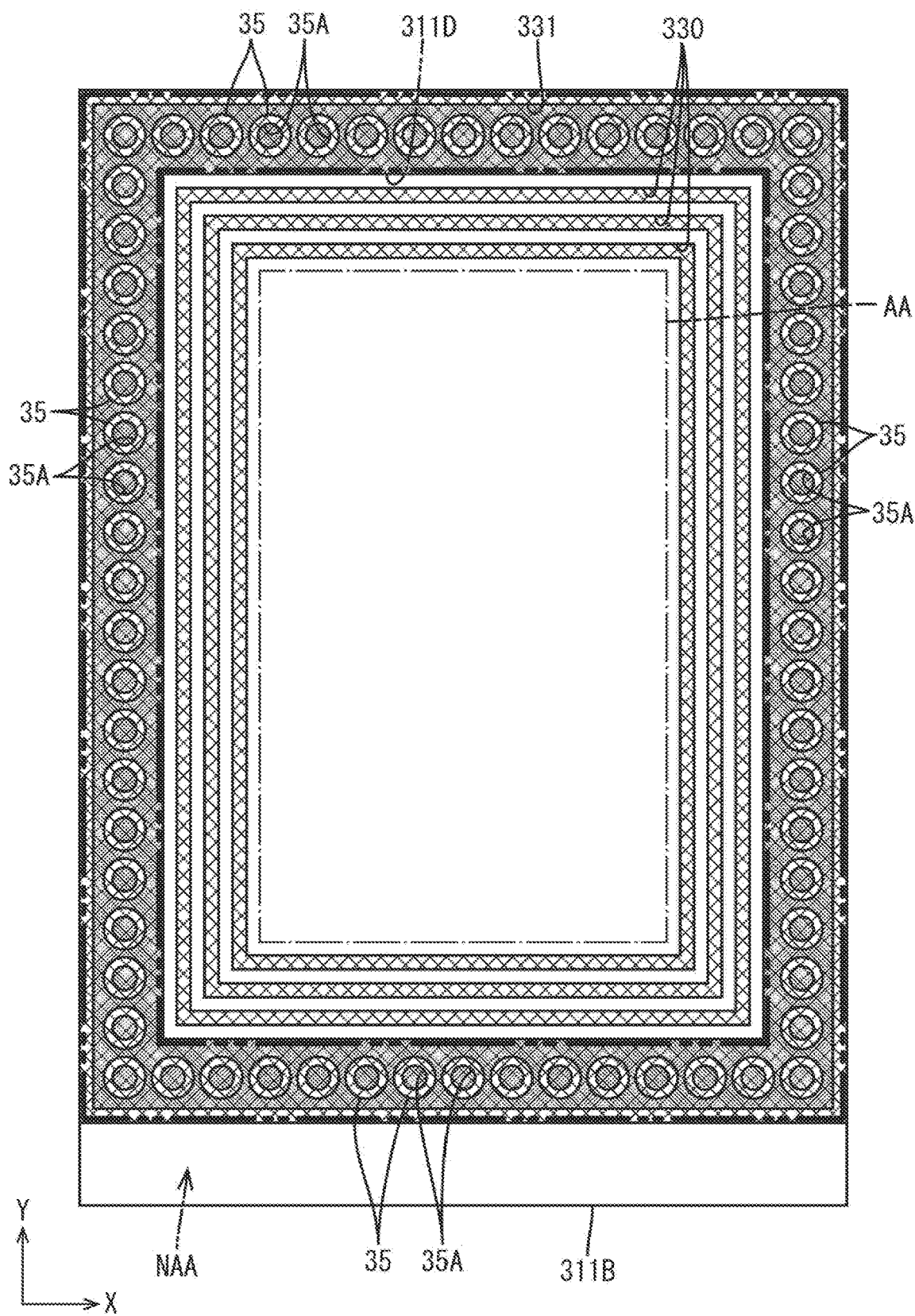
FIG. 8 is a plan view schematically illustrating a planar arrangement of an array-side film formation area regulating portion, seal-overlapping opening portions and the like of an array substrate of liquid crystal panel according to the fourth embodiment of the technology described herein.
Figure 9:
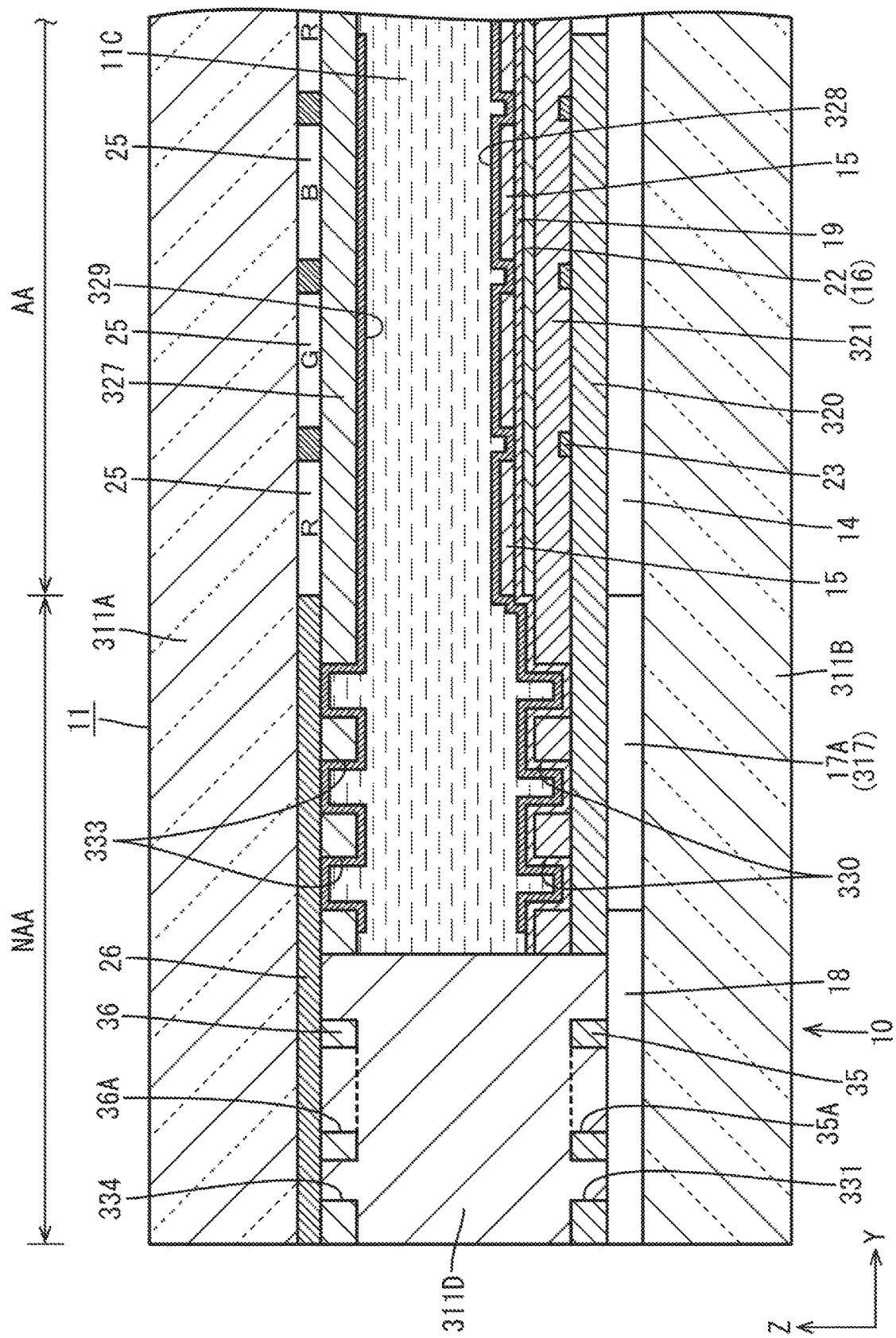
FIG. 9 is a cross sectional view taken along the short-side direction of an end portion of the liquid crystal panel.

As illustrated in FIG. 8 and FIG. 9, in the present embodiment, the first seal-overlapping opening portion 331 has a width dimension equivalent to a width dimension of seal portion 311D, and extends along the entire periphery of an array substrate 311B in parallel with the seal portion 311D. More specifically, the first seal-overlapping opening portion 331 may have a width dimension slightly smaller than the width dimension of the seal portion 311D, and is yet arranged to overlap most of the seal portion 311D. In the first seal-overlapping opening portion 331, the array-side tubular portions (tubular portions) 35 made of a first planarization film 320 are provided. The array-side tubular portions 35 have a cylindrical shape with an opening portion 35A disposed at a central side thereof. Accordingly, the opening portion 35A has a circular planar shape. The array-side tubular portions 35 are disposed at substantially the center in the width direction of the first seal-overlapping opening portion 331. A plurality of the array-side tubular portions 35 are disposed side by side at intervals in the direction in which the first seal-overlapping opening portion 331 extends. Specifically, a number of the array-side tubular portions 35 are disposed side by side at substantially equal intervals and in a row, along the entire periphery of the first seal-overlapping opening portion 331. Meanwhile, a CF-side seal-overlapping opening portion 334, similarly to the first seal-overlapping opening portion 331, has a width dimension equivalent to the width dimension of the seal portion 311D, and extends along the entire periphery of a CF substrate 311A in parallel with the seal portion 311D. The CF-side seal-overlapping opening portion 334 has a width dimension substantially equal to that of the first seal-overlapping opening portion 331. In the CF-side seal-overlapping opening portion 334, CF-side tubular portions 36 made of an overcoat film 327 are provided. The CF-side tubular portions 36, similarly to the array-side tubular portions 35, have a cylindrical shape having an opening portion 36A at the central side thereof. The CF-side tubular portions 36 are provided similarly to the array-side tubular portions 35. A number of the CF-side tubular portions 36 are provided to overlap the respective array-side tubular portions 35, as viewed in plan.

In this case, as a decrease in frame size is to achieved and the formation area of a peripheral circuit portions 317 becomes narrower, it may become necessary to reduce the number of array-side film formation area regulating portions 330 and CF-side film area regulating portions 333 that are installed, or to decrease the width dimension of the array-side film formation area regulating portions 330 and the CF-side film area regulating portions 333. As a result, it may become impossible to sufficiently regulate the flow of an array-side alignment film 328 and a CF-side alignment film 329 by means of the array-side film formation area regulating portions 330 and the CF-side film area regulating portions 333. Consequently, during formation of the array-side alignment film 328 and the CF-side alignment film 329, the material flowing on a second planarization film 321 and the planarization film 321 may move over the array-side film formation area regulating portions 330 and the CF-side film area regulating portions 333, and enters the first seal-overlapping opening portion 331 and the CF-side seal-overlapping opening portion 334. In this connection, the first seal-overlapping opening portion 331 and the CF-side seal-overlapping opening portion 334 respectively have disposed therein the array-side tubular portions 35 and the CF-side tubular portions 36 including the opening portions 35A, 36A at the central side thereof. Accordingly, even if the material of the array-side alignment film 328 and the CF-side alignment film 329 enters the first seal-overlapping opening portion 331 and the CF-side seal-overlapping opening portion 334, the material is less likely to move over the array-side tubular portions 35 and the CF-side tubular portions 36 and to enter the opening portions 35A, 36A. In this way, it becomes possible to expose the underlayer in the opening portions 35A, 36A of the array-side tubular portions 35 and the CF-side tubular portions 36. Accordingly, during the formation of the seal portion 311D, it becomes possible to cause the seal portion 311D to enter the opening portions 35A, 36A of the array-side tubular portions 35 and the CF-side tubular portions 36, and to closely contact the underlayer without the array-side alignment film 328 and the CF-side alignment film 329 disposed therebetween. In this way, the adhesion of the seal portion 311D can be maintained high in a preferable manner. In addition, the mutually plurality of array-side tubular portions 35 and CF-side tubular portions 36 respectively have the opening portions 35A, 36A. This increases the certainty that the opening portions 35A, 36A without the entry of the material of the array-side alignment film 328 and the CF-side alignment film 329 will remain. In this way, the adhesion of the seal portion 311D can be maintained even higher in a preferable manner.

As described above, the present embodiment is provided with the array-side tubular portions (tubular portions) 35 which are made of the first planarization film 320 and disposed in the first seal-overlapping opening portion 331, and which have the opening portion 35A at the central side. For example, as a decrease in frame size is achieved and the formation areas for the peripheral circuit portions 317 and the array-side film formation area regulating portions 330 become narrower, it may become impossible to sufficiently regulate the flow of the array-side alignment film 328 by means of the array-side film formation area regulating portions 330. As a result, the material of the array-side alignment film 328 that has moved over the array-side film formation area regulating portions 330 may enter the first seal-overlapping opening portion 331. However, the first seal-overlapping opening portion 331 has disposed therein the array-side tubular portions 35 having the opening portion 35A at the central side thereof. Accordingly, the material of the array-side alignment film 328 is less likely to move over the array-side tubular portions 35 and enter the opening portion 35A. This increases the certainty that the seal portion 311D will enter the opening portion 35A of the array-side tubular portions 35, and the adhesion of the seal portion 311D can be maintained high in a preferable manner.

A plurality of array-side tubular portions 35 are disposed side by side at intervals. In this way, because the mutually independent plurality of array-side tubular portions 35 have respective opening portions 35A, the certainty that the opening portions 35A without the entry of the material of the array-side alignment film 328 will remain is increased. Thus, the adhesion of the seal portion 31 ID can be maintained even higher in a preferable manner.

Fifth Embodiment

The fifth embodiment of the technology described herein will be described with reference to FIG. 10. In the fifth embodiment, the configuration of array-side tubular portions 435 is modified from that of the fourth embodiment. Redundant descriptions of structures, operations, and effects similar to those of the fourth embodiment will be omitted.

Figure 10:
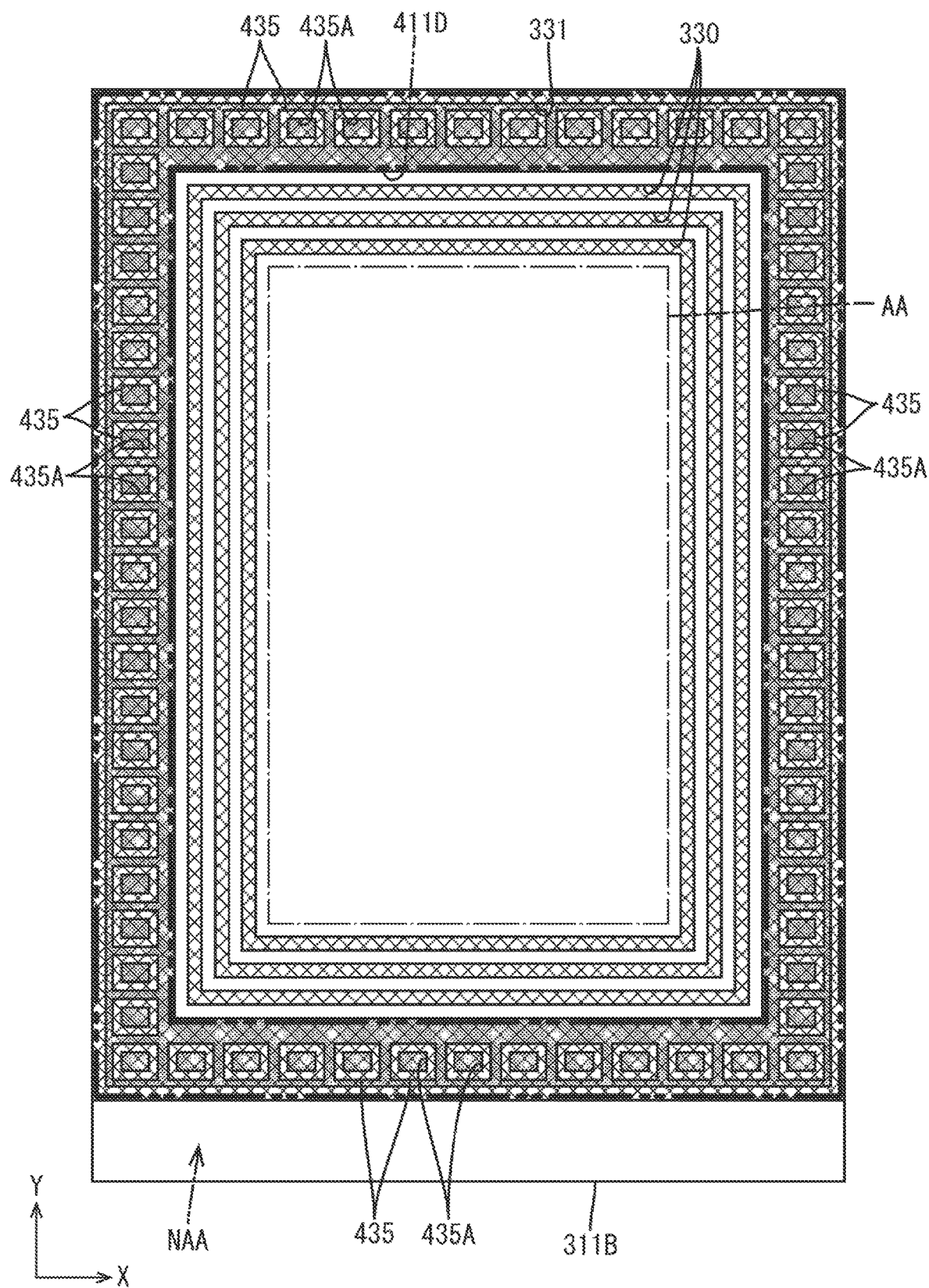
FIG. 10 is a plan view schematically illustrating a planar arrangement of an array-side film formation area regulating portion, seal-overlapping opening portions and the like of an array substrate of a liquid crystal panel according to the fifth embodiment of the technology described herein.

As illustrated in FIG. 10, in the present embodiment, the array-side tubular portions 435 have a quadrilateral angular tube shape. Accordingly, an opening portion 435A has a quadrilateral planar shape. In this configuration, the effect of maintaining the adhesion of a seal portion 411D high can be sufficiently obtained, similarly to in the fourth embodiment.

Sixth Embodiment

The sixth embodiment of the technology described herein will be described with reference to FIG. 11. In the sixth embodiment, the configuration of a liquid crystal panel 511 is modified from that of the first embodiment. Redundant descriptions of structures, operations, and effects similar to those of the first embodiment will be omitted.

Figure 11:
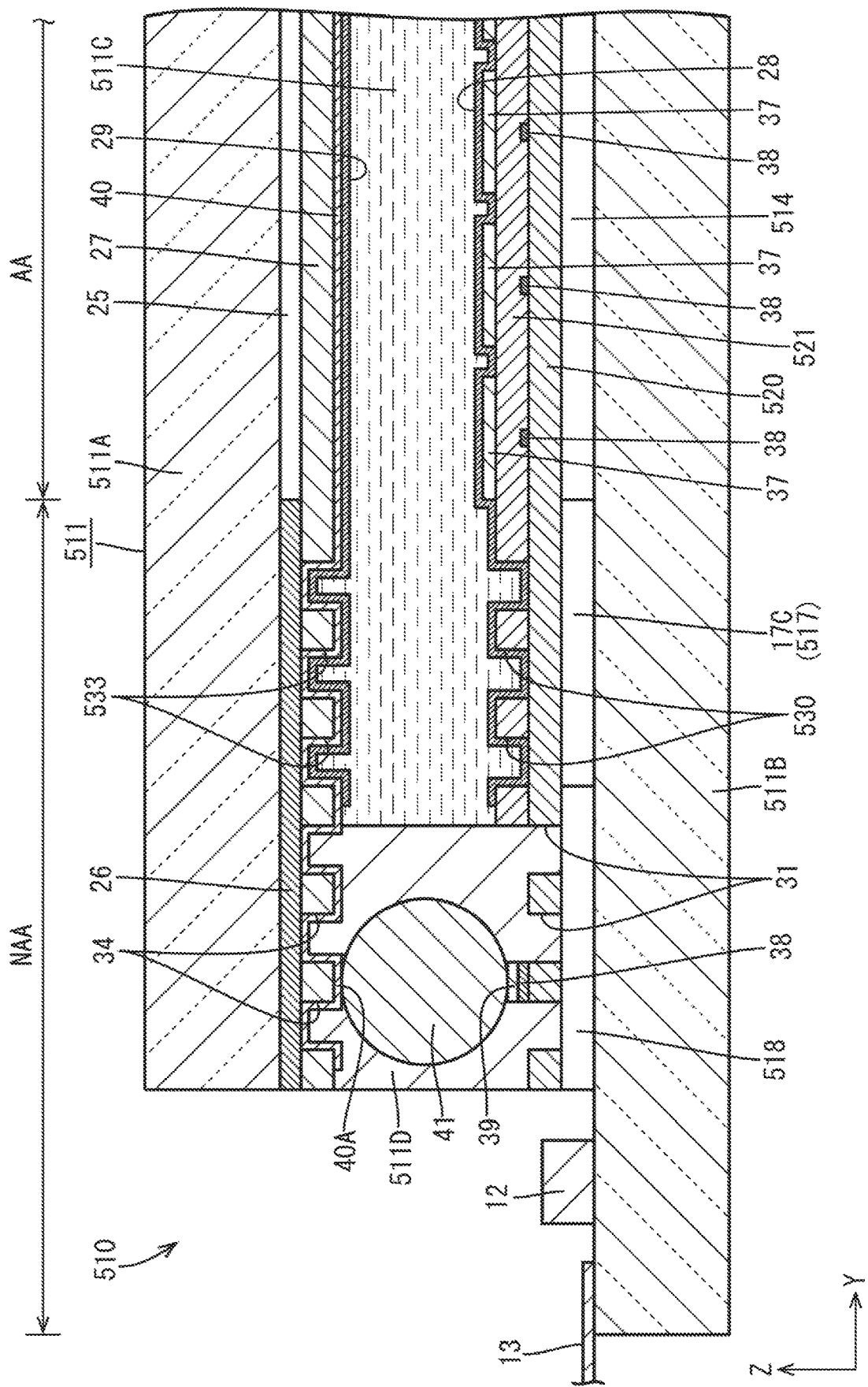
FIG. 11 is a cross sectional view taken along the long-side direction of an end portion of a liquid crystal panel according to the sixth embodiment of the technology described herein.

As illustrated in FIG. 11, in the present embodiment, the liquid crystal panel 511 is of a reflective in which an image is displayed by utilizing external, light, such as sunlight and light from a room lamp. Accordingly, in the present embodiment, the liquid crystal display device 510 does not include a backlight device. The reflective liquid crystal panel 511 does not include the touch panel function and related configurations (such as the touch electrodes 22 and the touch wires 23) provided in the liquid crystal panel 11 according to the first embodiment, and solely provides a display function. In the following, the specific configuration of the reflective liquid crystal panel 511 will be described.

An array substrate 511B of the reflective liquid crystal panel 511 includes, instead of the pixel electrodes 15 (see FIG. 2) described in the first embodiment which are made of the transparent electrode film, reflective pixel electrodes 37 made of a metal film. The reflective pixel electrodes 37 are configured to efficiently reflect external light by means of a surface having metallic luster. The array substrate 511B is provided with relay portions (relay electrodes) 38 that are made of a metal film and interposed between a first planarization film 520 and a second planarization film 521. The relay portions 38 are provided in the display region AA and the non-display region NAA. In the display region AA, the relay portions 38 are provided on the upper layer side of the first planarization film 520, where the relay portions 38 provide relay-connection between the reflective pixel electrodes 37 on the upper layer side and a pixel circuit portion 514 on the lower layer side. The relay portions 38 provided in the display region AA are arranged to overlap the reflective pixel electrodes 37, as viewed in plan, and are provided as many as the number of the reflective pixel electrodes 37 installed. In the non-display region NAA, the relay portions 38 are provided on the upper layer side of the first planarization film 520, where the relay portions 38 are arranged to overlap a seal portion 511D and a wire connection portion 518. In the non-display region NAA, a reference potential portion 39 made of the same metal film as that of the reflective pixel electrodes 37 is provided in a position overlapping the relay portions 38. The reference potential portion 39 is connected to the wire connection portion 518 via the relay portions 38. The wire connection portion 518 is provided with wires for supplying a reference potential signal to the reference potential portion 39. In the display region AA, the first planarization film 520 and the second planarization film 521 are formed with contact holes (not illustrated) in positions overlapping the reflective pixel electrodes 37, the relay portions 38, the reference potential portion 39, the pixel circuit portion 514, and the wire connection portion 518.

A CF substrate 511A of the reflective liquid crystal panel 511 includes a counter electrode 40 opposing the reflective pixel electrodes 37. The counter electrode 40 is disposed on the upper layer side of an overcoat film 527, and is made of a transparent electrode film. The counter electrode 40 is provided as a solid film at least in the display region AA, and faces all of the reflective pixel electrodes 37 with a liquid crystal layer 511C disposed therebetween. The counter electrode 40 includes a body portion disposed in the display region AA and an extension portion 40A extending to the non-display region NAA side. A part of the extension portion 40A overlaps the seal portion 511D and the reference potential portion 39. The seal portion 511D contains electrically conductive particles 41. The electrically conductive particles 41 contained in the seal portion 511D provide electrical continuity/connection between the extension portion 40A of the counter electrode 40 and the reference potential portion 39. Accordingly, the reference potential signal transmitted to the wires in the wire connection portion 518 is supplied to the counter electrode 40 via the relay portions 38, the reference potential portion 39, and the electrically conductive particles 41. In this way, the counter electrode 40 is maintained at a constant reference potential. Accordingly, a potential difference based on a potential with which the reflective pixel electrodes 37 are charged can be produced between the counter electrode 40 and the reflective pixel electrodes 37. Using an electric field generated based on the potential difference between the counter electrode 40 and the reflective pixel electrodes 37, the alignment state of the liquid crystal molecules included in the liquid crystal layer 511C can be controlled.

In the reflective liquid crystal panel 511 described above, similarly to the first embodiment, a decrease in frame size is also achieved by the array-side film formation area regulating portion 530 and the CF-side film formation area regulating portion 533 being arranged overlap the peripheral circuit portion 517. Other operations and effects may be similar to those of the first embodiment.

Other Embodiments

The technology described herein is not limited to the embodiments described above and with reference to the drawings. The following embodiments may be included in the technical, scope.

Figure 12:
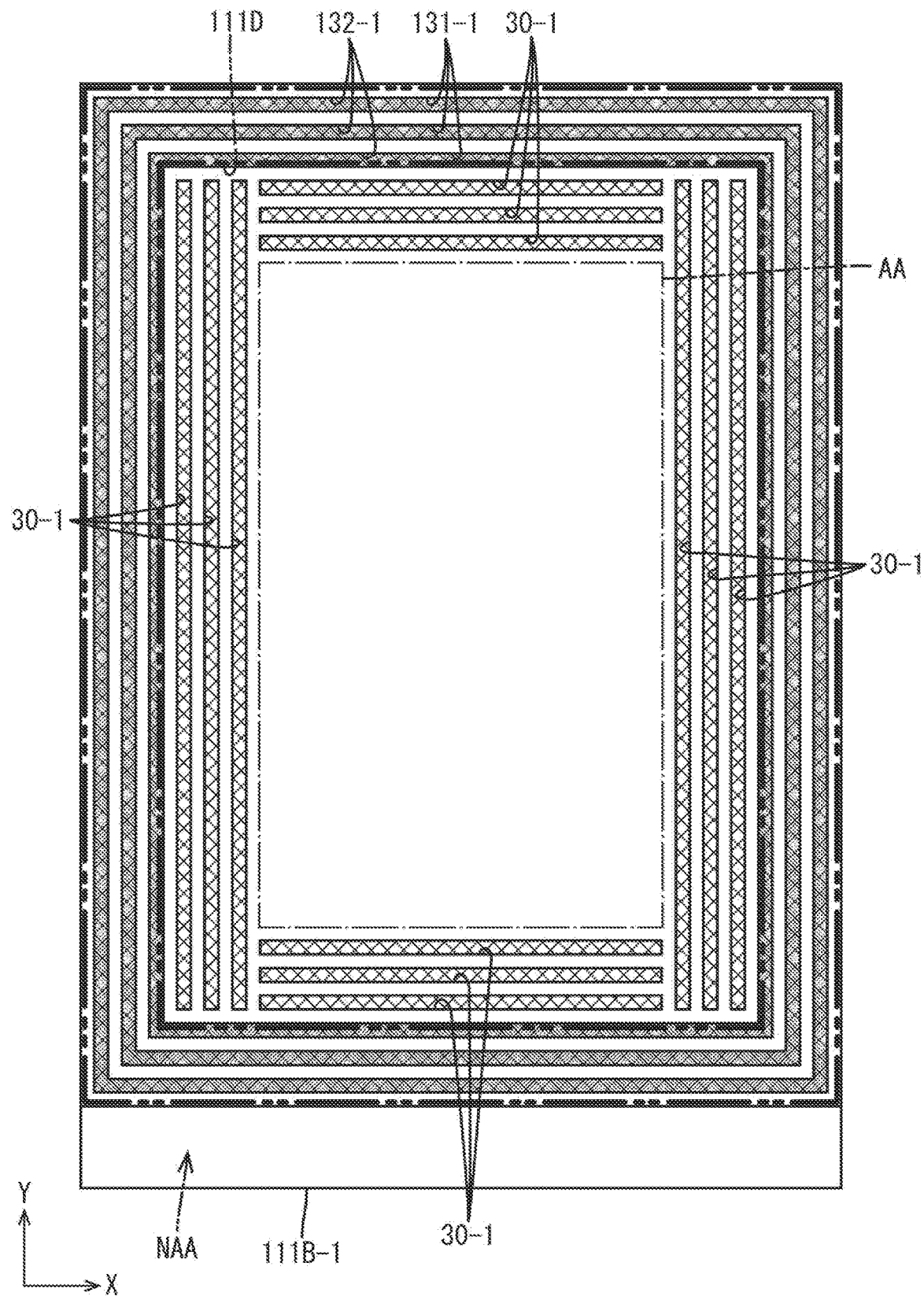
FIG. 12 is a plan view schematically illustrating a planar arrangement of an array-side film formation area regulating portion, seal-overlapping opening portions and the like of an array substrate of a 1 quid crystal panel according to another embodiment (1) of the technology described herein.

(1) A modification of the second embodiment may include a configuration in which, as illustrated in FIG. 12, first seal-overlapping opening portions 131-1 and second seal-overlapping opening portions 132-1 have an endless annular shape, and array-side film formation area regulating portions 30-1 have an annular shape with ends. Four array-side film formation area regulating portions 30-1 are provided to extend linearly along a pair of short sides and a pair of long sides of an array substrate 111B-1.

Figure 13:
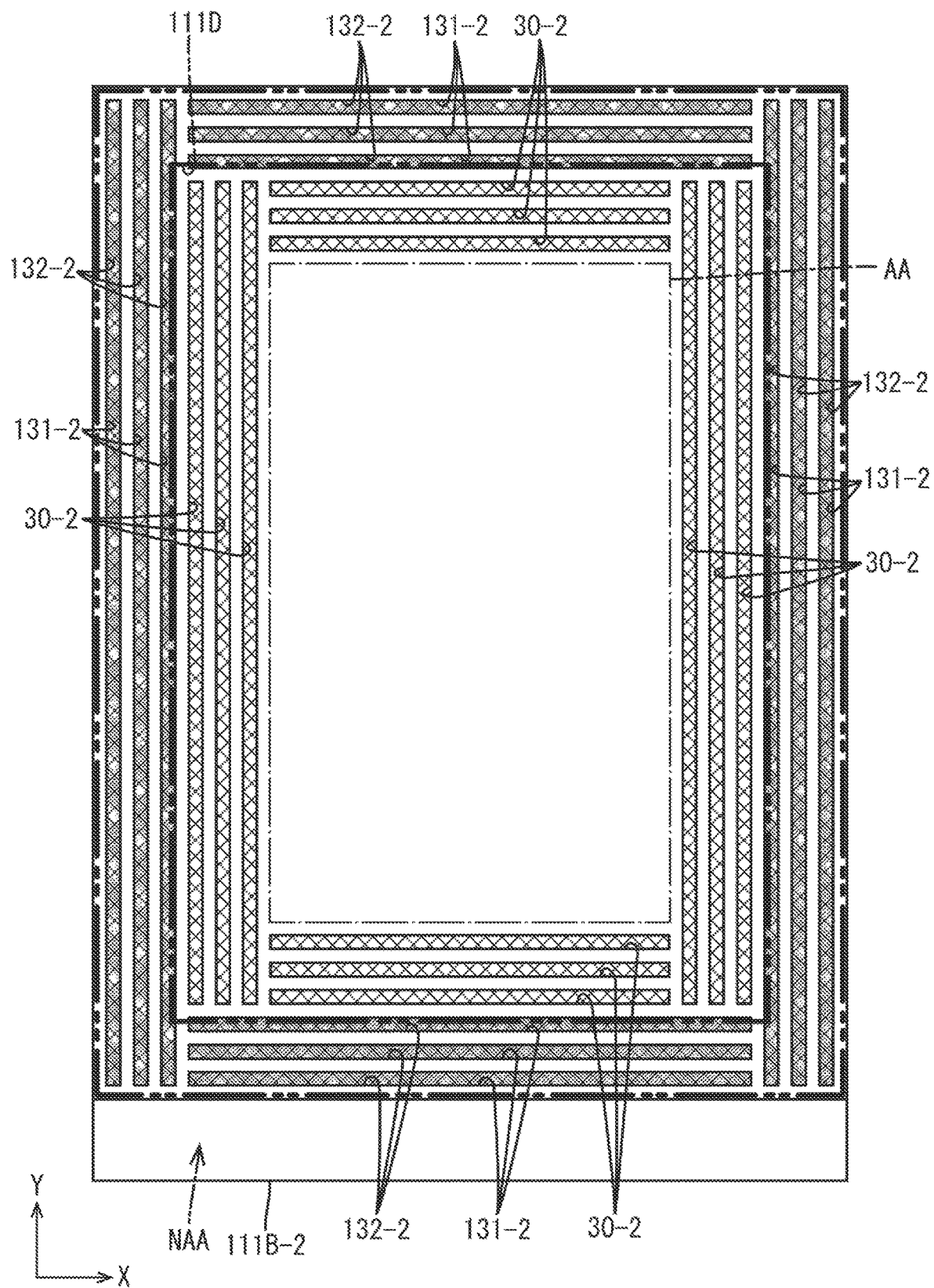
FIG. 13 is a plan view schematically illustrating a planar arrangement of an array-side film formation area regulating portion, seal-overlapping opening portions and the like of an array substrate of a liquid crystal panel according to another embodiment (2) of the technology described herein.

(2) A modification of the second embodiment may include a configuration in which, as illustrated in FIG. 13, first seal-overlapping opening portions 131-2, second seal-overlapping opening portions 132-2, and array-side film formation area regulating portions 30-2 have an annular shape with ends. Four each of the first seal-overlapping opening portions 131-2, the second seal-overlapping opening portions 132-2, and the array-side film formation area regulating portions 30-2 are provided to extend linearly along a pair of short sides and a pair of long sides of an array substrate 111B-2.

(3) In the foregoing embodiments (except for the third embodiment), the case has been described in which the array-side film formation area regulating portion and the first seal-overlapping opening portion extend linearly along the outer periphery of the array substrate. However, the array-side film formation area regulating portion and the first seal-overlapping opening portion may be bent or curved midway along the outer periphery of the array substrate. Specifically, the array-side film formation area regulating portion and the first seal-overlapping opening portion, as viewed in plan, may have a wavy shape or saw-toothed shape, for example. The specific planar shape of the array-side film formation area regulating portion and the first seal-overlapping opening portion may be modified in other ways, as appropriate.

(4) In the foregoing embodiments, the case has been described in which the second seal-overlapping opening portion extends linearly along the outer periphery of the array substrate. However, similarly to the description in (3), the second seal-overlapping opening portion may be bent or curved midway along the extension. The specific planar shape of the second seal-overlapping opening portion may be modified in ways other than wavy shape or saw-toothed shape, as appropriate. The planar shape of the CF-side film formation area regulating portion and the CF-side seal-overlapping opening portion may also be similarly modified.

(5) In the foregoing embodiments (except for the third embodiment), the case has been described in which the array-side film formation area regulating portion and the first seal-overlapping opening portion linearly extend to have lengths equivalent to the short side or long side of at least the array substrate. However, the array-side film formation area regulating portion and the first seal-overlapping opening portion may have lengths less than the length of the short side or long side of the array substrate.

(6) In the foregoing embodiments, the case has been described in which the second seal-overlapping opening portion linearly extends to have a length equivalent to the short side or long side of at least the array substrate. However, similarly to the description in (5), the length of the second seal-overlapping opening portion may be less than the length of the short side or long side of the array substrate. The lengths of the CF-side film formation area regulating portion and the CF-side seal-overlapping opening portion may also be similarly modified.

(7) In the foregoing embodiments, the case has been described in which three array-side film formation area regulating portion having an annular shape are provided side by side in the inner-outer direction. However, two, or four or more annular array-side film formation area regulating portions may be provided side by side in the inner-outer direction. It is also possible to provide only one annular array-side film formation area regulating portion. The number of the CF-side film formation area regulating portions and the CF-side seal-overlapping opening portions arranged side by side may also be similarly modified.

(8) In the foregoing embodiments (except for the third embodiment), the cases have been described in which three first seal-overlapping opening portions having an annular shape are provided side by side in the inner-outer direction, or only one first seal-overlapping opening portion is provided. However, two, or four or more annular first seal-overlapping opening portions may be provided side by side in the inner-outer direction.

(9) In the foregoing embodiments, the configuration has been described in which the array-side film formation area regulating portion of the array substrate and the CF-side film formation area regulating portion of the CF substrate are provided to overlap each other. However, the array-side film formation area regulating portion and the CF-side film formation area regulating portion may be arranged so as not to overlap each other. Similarly, the first seal-overlapping opening portion of the array substrate and the CF-side seal-overlapping opening portion of the CF substrate may be arranged so as not to overlap each other.

(10) In the foregoing embodiments, the case has been described in which the array-side film formation area regulating portion penetrates through the second planarization film. However, the array-side film formation area regulating portion may include a recess that does not penetrate through the second planarization film. In this way, exposure of the touch wires interposed between the first planarization film and the second planarization film can be avoided, making it less likely for the touch wires to have a short-circuit. Similarly, the CF-side film formation area regulating portion may include a recess that does not penetrate through the overcoat film. The array-side film formation area regulating portion and the CF-side film formation area regulating portion may be formed in a non-penetrating manner, as described above, by subjecting, during the patterning of the second planarization film or the overcoat film, the portion in which to form the array-side film formation area regulating portion or the CF-side film formation area regulating portion to halftone exposure using a halftone mask or a gray tone mask.

(11) In the foregoing embodiments (except for the sixth embodiment), the case has been described in which the touch wires are interposed between both planarization films. However, the touch wires may be disposed on the upper layer side of the second planarization film. In this case, it is preferable to interpose an insulating film between the touch wires and the touch electrodes (common electrode), and to form a touch wire contact hole in the insulating film, as appropriate.

(12) In the third embodiment, the case has been described in which the dot-like first seal-overlapping opening portions have a substantially square planar shape. However, the planar shape of the dot-like first seal-overlapping opening portions may be modified to rectangle, triangle, trapezoid, rhombus, polygon having five or more sides (including honeycomb shape), circle, or ellipse, for example. The first seal-overlapping opening portion may also have a latticed planar shape.

(13) In the third embodiment, the case has been described in which the dot-like first seal-overlapping opening portions are disposed side by side in a matrix. However, the dot-like first seal-overlapping opening portions may be disposed side by side in a staggered manner.

(14) In the fourth and fifth embodiments, the case has been described in which the array-side tubular portions, the CF-side tubular portions, and their opening portions have circular or substantially square planar shape. However, the planar shape of the array-side tubular portions, the CF-side tubular portions, and their opening portions may be modified to ellipse, rectangle, triangle, trapezoid, rhombus, or polygon having five or more sides (including honeycomb shape), for example.

(15) In the fourth and fifth embodiments, the case has been described in which the array-side tubular portions and the CF-side tubular portions are disposed side by side in a row. However, the array-side tubular portions and the CF-side tubular portions may be arranged to form rows. The array-side tubular portions and the CF-side tubular portions may also be disposed side by side in a matrix or in a staggered manner, as viewed in plan.

(16) In the sixth embodiment, the reflective liquid crystal panel is provided with color filters of the three colors of R, G, and B, similarly to the transmissive liquid crystal panel of the first embodiment. However, a reflective liquid crystal panel of monochromatic display type may be provided with a color filter of the single color of blue. Reflective liquid crystal panels tend to produce display images that are often tinted with yellow due to the use of external light for the display. Accordingly, the use of a color filter of blue that is a complementary color to yellow enables suppression of the coloring of the display image. It is also possible to use a white (colorless and transparent) color filter for the reflective liquid crystal panel.

(17) In the foregoing embodiments (except for the sixth embodiment), the case has been described in which the touch panel pattern is of a self-capacitance type. However, the touch panel pattern may be of a mutual capacitance type.

(18) In embodiments other than the foregoing embodiments, it is also possible to exchange the order in which the pixel, electrode and the common electrode are stacked.

(19) In the foregoing embodiments, the case has been described in which the planar shape of the liquid crystal panel is oblong quadrilateral. Alternatively, the planar shape may be horizontally long quadrilateral or square, for example. The planar shape may also be non-quadrilateral (whose outline is partly or entirely curved), such as circle, ellipse, or trapezoid.

(20) In the foregoing embodiments, the configuration of the liquid crystal panel has been described by way of example in which the liquid crystal layer is sandwiched between a pair of substrates. However, the technology described herein is also applicable to display panels in which functional organic molecules other than liquid crystal material is sandwiched between a pair of substrates.

(21) In the foregoing embodiments (except for the sixth embodiment), the configuration has been described in which the touch wires interposed between the first planarization film and the second planarization film extend to the SSD circuit portion. However, the formation area for the touch wires may be limited to the display region side of the array-side film formation area regulating portion, so that the touch wires do not overlap the array-side film formation area regulating portion. In this case, a lead-out wire made of a metal film on the lower layer side of the first planarization film may be provided, and the lead-out wire and the touch wires may be connected via a contact hole formed in at least the first planarization film at a position on the display region side of the array-side film formation area regulating portion.

The invention claimed is:

1. A display device substrate comprising:
   a circuit portion;
   a first organic insulating film disposed on an upper layer side of the circuit portion;
   a second organic insulating film disposed on an upper layer side of the first organic insulating film;
   an alignment film disposed on an upper layer side of the second organic insulating film;
   a film formation area regulating portion comprising a recess in a part of the second organic insulating film and disposed to regulate a film formation area of the alignment film and to overlap the circuit portion; and
   touch wires disposed between the first organic insulating film and the second organic insulating film.

2. The display device substrate according to claim 1, further comprising:
   a seal portion disposed on the upper layer side of the second organic insulating film and on an outer side of the film formation area regulating portion;
   a first seal-overlapping opening portion comprising an opening in a part of the first organic insulating film and disposed to overlap at least a part of the seal portion; and
   a second seal-overlapping opening portion comprising an opening in a part of the second organic insulating film and disposed to overlap at least the first seal-overlapping opening portion.

3. The display device substrate according to claim 2, wherein the second seal-overlapping opening portion includes a formation area overlapping at least an entire area of the seal portion.

4. The display device substrate according to claim 2, wherein the first seal-overlapping opening portion extends along an outer periphery of the display device substrate.

5. The display device substrate according to claim 4, wherein the first seal-overlapping opening portion extends along an entire periphery of the display device substrate and forms an endless annular shape.

6. The display device substrate according to claim 2, further comprising a plurality of the first seal-overlapping opening portions disposed side by side at intervals along an outer periphery of the display device substrate.

7. The display device substrate according to claim 2, further comprising a tubular portion made of the first organic insulating film, disposed in the first seal-overlapping opening portion, and having an opening portion at a central side of the tubular portion.

8. The display device substrate according to claim 7, further comprising a plurality of the tubular portions disposed side by side at intervals.

9. The display device substrate according to claim 1, wherein the film formation area regulating portion extends along an outer periphery of the display device substrate.

10. The display device substrate according to claim 9, wherein the film formation area regulating portion extends along an entire periphery of the display device substrate and forms an endless annular shape.

11. A display device comprising:
    the display device substrate according to claim 1; and
    a counter substrate disposed to face the display device substrate.

12. The display device according to claim 11, further comprising:
    an opposing-side insulating film disposed on the counter substrate;
    an opposing-side alignment film disposed on an upper layer side of the opposing-side insulating film; and
    an opposing-side film formation area regulating portion comprising a recess in a part of the opposing-side insulating film and regulating a film formation area of the opposing-side alignment film, the opposing-side film formation area regulating portion being disposed to overlap the circuit portion.

13. The display device according to claim 12, further comprising:
    a seal portion disposed on an outer side of the film formation area regulating portion and the opposing side film formation area regulating portion, and sealing between the display device substrate and the counter substrate; and an opposing-side seal-overlapping opening portion comprising an opening in a part of the opposing-side insulating film and disposed to overlap at least a part of the seal portion.

\* \* \* \* \*